United States Patent
Nishida et al.

(10) Patent No.: US 9,870,742 B2
(45) Date of Patent: *Jan. 16, 2018

(54) LIQUID CRYSTAL DEVICE, METHOD OF DRIVING LIQUID CRYSTAL DEVICE, AND ELECTRONIC APPARATUS

(71) Applicant: SEIKO EPSON CORPORATION, Tokyo (JP)

(72) Inventors: Masakazu Nishida, Chino (JP); Naoki Tomikawa, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

This patent is subject to a terminal disclaimer.

(21) Appl. No.: 15/011,624

(22) Filed: Jan. 31, 2016

(65) Prior Publication Data

US 2016/0253973 A1    Sep. 1, 2016

(30) Foreign Application Priority Data

Feb. 27, 2015  (JP) .................................. 2015-037881

(51) Int. Cl.
```
G09G 3/36      (2006.01)
G02F 1/1343    (2006.01)
G02F 1/1339    (2006.01)
G02F 1/1333    (2006.01)
```
(52) U.S. Cl.
CPC ..... *G09G 3/3614* (2013.01); *G02F 1/134309* (2013.01); *G09G 3/3655* (2013.01); *G02F 1/1339* (2013.01); *G02F 2001/133388* (2013.01); *G02F 2201/50* (2013.01); *G09G 2300/0413* (2013.01); *G09G 2300/0426* (2013.01); *G09G 2320/0257* (2013.01)

(58) Field of Classification Search
None
See application file for complete search history.

(56) References Cited

U.S. PATENT DOCUMENTS

| | | | |
|---|---|---|---|
| 3,708,717 A | 1/1973 | Fleming | |
| 8,081,153 B2 | 12/2011 | Shirasaka et al. | |
| 9,412,319 B2* | 8/2016 | Tomikawa | ............ G09G 3/3614 |
| 2004/0032557 A1* | 2/2004 | Lee | .................... G02F 1/136286 349/141 |
| 2006/0007378 A1 | 1/2006 | Nakao et al. | |
| 2008/0055529 A1* | 3/2008 | Shirasaka | ......... G02F 1/134309 349/143 |

(Continued)

FOREIGN PATENT DOCUMENTS

| | | |
|---|---|---|
| JP | H02-3086 A | 1/1990 |
| JP | 2002-122840 A | 4/2002 |

(Continued)

*Primary Examiner* — Chad Dicke
(74) *Attorney, Agent, or Firm* — Oliff PLC

(57) ABSTRACT

A liquid crystal device includes a first electrode that is supplied with a first potential, a second electrode that is provided between the first electrode and a sealing member and is supplied with a second potential, and a third electrode that is provided between the second electrode and the sealing member and is supplied with a third potential. A width of the third electrode is greater than widths of the first electrode and the second electrode in a direction from an outer edge of a display region toward the sealing member.

20 Claims, 15 Drawing Sheets

(56) References Cited

U.S. PATENT DOCUMENTS

| | | |
|---|---|---|
| 2009/0072136 A1 | 3/2009 | Pringle et al. |
| 2010/0218889 A1 | 9/2010 | Verschueren et al. |
| 2012/0242914 A1 | 9/2012 | Hara et al. |
| 2012/0249918 A1 | 10/2012 | Yasui |
| 2012/0256082 A1 | 10/2012 | Masujima et al. |
| 2012/0307176 A1 | 12/2012 | Tanaka |
| 2013/0021657 A1 | 1/2013 | Tomikawa et al. |
| 2013/0027446 A1 | 1/2013 | Nishida et al. |
| 2013/0300961 A1 | 11/2013 | Tomikawa |
| 2013/0302921 A1 | 11/2013 | Tomikawa |
| 2014/0368481 A1 | 12/2014 | Tomikawa |

FOREIGN PATENT DOCUMENTS

| | | |
|---|---|---|
| JP | 2007-279172 A | 10/2007 |
| JP | 2007-316119 A | 12/2007 |
| JP | 2008-58497 A | 3/2008 |
| JP | 2008-89938 A | 4/2008 |
| JP | 2008-292861 A | 12/2008 |
| JP | 2012-042872 A | 3/2012 |
| JP | 2012-198395 A | 10/2012 |
| JP | 2012-208300 A | 10/2012 |
| JP | 2012-247662 A | 12/2012 |
| JP | 2012-247663 A | 12/2012 |
| JP | 2013-25066 A | 2/2013 |
| JP | 2013-235128 A | 11/2013 |
| JP | 2013-235171 A | 11/2013 |
| JP | 2015-001634 A | 1/2015 |
| JP | 2015-111247 A | 6/2015 |

* cited by examiner

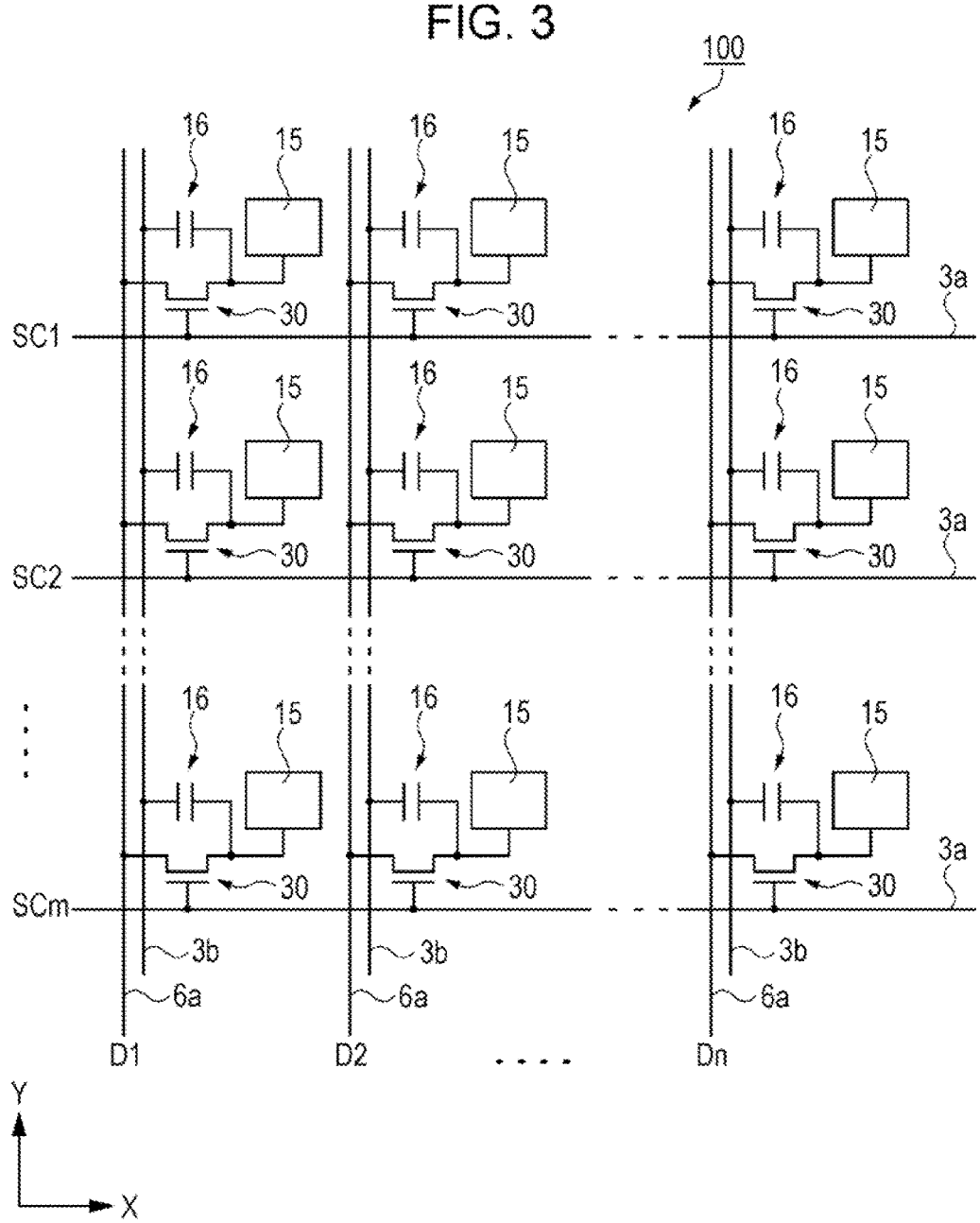

LIQUID CRYSTAL DEVICE, METHOD OF DRIVING LIQUID CRYSTAL DEVICE, AND ELECTRONIC APPARATUS

BACKGROUND

1. Technical Field

The present invention relates to a liquid crystal device, a method of driving a liquid crystal device, and an electronic apparatus.

2. Related Art

A liquid crystal device includes a liquid crystal panel with a liquid crystal layer interposed between a pair of substrates. If light is incident on such a liquid crystal device, there may be a case in which a liquid crystal material, an orientation film, and the like that form the liquid crystal panel cause a photochemical reaction due to the incident light and ionic impurities are generated as a reaction product. In addition, it has been known that there are ionic impurities that are diffused in the liquid crystal layer from a sealing member, a shielding member, or the like in the course of manufacturing the liquid crystal panel. In a liquid crystal device used as a light modulation structure (light valve) in a projection-type display apparatus (projector), in particular, light flux density of the incident light is higher than that of a direct view-type liquid crystal device. Therefore, it is necessary to suppress an influence of the ionic impurities on display.

As a structure for suppressing the influence of the ionic impurities on display, JP-A-2015-001634 discloses a driving method in which three electrodes (ion trap electrodes) are arranged in an outer circumference of a display region and AC signals with mutually different phases are supplied within a period of time corresponding to one cycle.

According to the driving method disclosed in JP-A-2015-001634, an electric field in a lateral direction is caused among the three electrodes, and force that moves the ionic impurities from the display region toward the outer circumference of the display region works in addition to a flow caused by fine fluctuation of the liquid crystal. For this reason, it is possible to efficiently accumulate the ionic impurities at the electrode located at the outermost circumference from among the aforementioned three electrodes, and to thereby provide a liquid crystal device that reduces display failures such as image persistence caused by the ionic impurities.

However, according to the liquid crystal device disclosed in JP-A-2015-001634, there is a concern that if the ionic impurities that move from the display region to the outer circumference of the display region are accumulated at the electrode located at the outermost circumference, force of accumulating the ionic impurities gradually deteriorates. This is considered to be because if the ionic impurities are accumulated at the electrode located at the outermost circumference, repelling force between the ionic impurities increases with elapse of time, and as a result, an effect of efficiently accumulating the ionic impurities at the electrode located at the outermost circumference deteriorates.

That is, there is a problem that the influence of the ionic impurities included in the liquid crystal layer on the display cannot always be suppressed sufficiently.

SUMMARY

The invention can be realized as the following aspects or application examples.

Application Example

According to this application example, there is provided a liquid crystal device including: a first substrate and a second substrate that are arranged so as to face each other and are attached to each other via a sealing member; a liquid crystal layer that is interposed between the first substrate and the second substrate; pixel electrodes that are provided in a display region on the first substrate; a counter electrode that is provided on the first substrate or the second substrate so as to face the pixel electrodes; a first electrode that is provided between the display region and the sealing member in a plan view and is supplied with a first potential; a second electrode that is provided between the first electrode and the sealing member in a plan view and is supplied with a second potential; and a third electrode that is provided between the second electrode and the sealing member in a plan view and is supplied with a third potential, the first electrode, the second electrode, and the third electrode being provided on the first substrate or the second substrate, in which AC signals with the same frequency are applied to each of the first electrode, the second electrode, and the third electrode such that the second potential shifts from positive polarity or a reference potential to negative polarity after the first potential shifts from the positive polarity or the reference potential to the negative polarity and before the first potential then shifts to the reference potential or the positive polarity, the third potential shifts from the positive polarity or the reference potential to the negative polarity after the second potential shifts to the negative polarity and before the second potential then shifts to the reference potential or the positive polarity, the second potential shifts from the negative polarity or the reference potential to the positive polarity after the first potential shifts from the negative polarity or the reference potential to the positive polarity and before the first potential then shifts to the reference potential or the negative polarity, and the third potential shifts from the negative polarity or the reference potential to the positive polarity after the second potential shifts from the negative polarity or the reference potential to the positive polarity and before the second potential then shifts to the reference potential or the negative polarity, and in which a width of the third electrode is wider than widths of the first electrode and the second electrode in a direction from an outer edge of the display region toward the sealing member.

With such a configuration, the AC signals with different phases are applied to the first electrode, the second electrode, and the third electrode in this order within a period of time corresponding to one cycle in which the first potential shifts from the reference potential to the positive polarity and the negative polarity. Therefore, a direction of an electronic field (line of electric force) generated among these electrodes moves from the first electrode that is close to the display region to the second electrode and from the second electrode to the third electrode with elapse of time.

Therefore, if ionic impurities are included in the liquid crystal layer, the ionic impurities are attracted to the first electrode first, are then attracted to the second electrode, and are attracted to the third electrode along with the movement in the direction of the electric field.

At this time, the wider width of the third electrode, which is arranged at the outermost circumference, than the widths of the first electrode and the second electrode can improve force of accumulating the ionic impurities at the third electrode.

That is, it becomes possible to effectively attract the ionic impurities in the liquid crystal layer from the display region to the outer circumference of the display region. As a result, it is possible to provide a liquid crystal device in which an influence of the ionic impurities included in the liquid crystal layer on the display, such as image persistence, is reduced.

In the liquid crystal device according to the application example, it is preferable that the width of the third electrode is equal to or greater than 1.86 times as wide as the width of the first electrode.

With such a configuration, it is possible to reliably enhance the force of accumulating the ionic impurities at the third electrode.

In the liquid crystal device according to the application example, it is preferable that the first electrode, the second electrode, and the third electrode are provided on the first substrate so as to surround the display region.

With such a configuration, it is possible to attract the ionic impurities from the display region to the outer circumference of the display region regardless of how the ionic impurities tend to be eccentrically located in the display region.

In the liquid crystal device according to the application example, the display region may include corners, and the first electrode, the second electrode, and the third electrode may be arranged along at least one of the corners.

With such a configuration, it is possible to reduce a space for arranging the first electrode to the third electrode. Therefore, it is possible to secure a space for arranging another circuit, for example, outside the display region.

In the liquid crystal device according to the application example, the sealing member may include an injection port for injecting liquid crystal into the liquid crystal layer, and the first electrode, the second electrode, and the third electrode may be provided on the side of the injection port.

With such a configuration, it is possible to effectively accumulate the ionic impurities generated from the injection port.

In the liquid crystal device according to the application example, the first electrode, the second electrode, and the third electrode may be provided along a direction that intersects an orientation direction (liquid crystal orientation) of the liquid crystal layer.

With such a configuration, it is possible to effectively accumulate the ionic impurities that have moved along the orientation direction (liquid crystal orientation) of the liquid crystal layer.

In the liquid crystal device according to the application example, the first electrode, the second electrode, and the third electrode may be provided along a direction that intersects a scanning direction of an image signal applied to the pixel electrodes in the display region.

With such a configuration, it is possible to effectively accumulate the ionic impurities that have moved along the scanning direction of the image signal.

In the liquid crystal device according to the application example, it is preferable that the display region includes an electronic parting section with dummy pixel electrodes provided so as to surround the plurality of pixel electrodes and that a gap between the electronic parting section and the first electrode is greater than a gap between the first electrode and the second electrode.

With such a configuration, it is possible to reduce the influence of a lateral electric field generated between the first electrode and the electronic parting section on attraction of the ionic impurities.

In the liquid crystal device according to the application example, it is preferable that the first electrode, the second electrode, the third electrode are provided on the first substrate, that the counter electrode is provided on the second substrate, and that an outer edge of the counter electrode is located between the first electrode and the outer edge of the display region in a plan view.

With such a configuration, each of the first electrode, the second electrode, and the third electrode does not face the counter electrode via the liquid crystal layer. Therefore, the electric field is not easily generated between each of the first electrode, the second electrode, and the third electrode and the counter electrode. That is, it is possible to effectively attract the ionic impurities to the outside of the display region by the electric fields generated between adjacent electrodes from among the first electrode, the second electrode, and the third electrode.

In the liquid crystal device according to the application example, the first electrode, the second electrode, and the third electrode may be provided on the first substrate, and the counter electrode may include the display region in a plan view on the second substrate, may be provided so as to extend to a region at which the counter electrode faces the first electrode, the second electrode, and the third electrode, and may be supplied with the reference potential.

With such a configuration, it is not necessary to pattern the counter electrode such that the counter electrode does not face the first electrode, the second electrode, and the third electrode. Therefore, it is possible to simplify a configuration of a wiring that is connected to the counter electrode or the like.

In the liquid crystal device according to the application example, each of the pixel electrodes and the counter electrode may be covered with an inorganic orientation film.

With such a configuration, it is possible to provide a liquid crystal device in which the influence of the ionic impurities on display is reduced even if the inorganic orientation film that easily adsorbs the ionic impurities is employed.

Application Example

According to this application example, there is provided a method of driving a liquid crystal device including a first substrate and a second substrate that are arranged so as to face each other and are attached to each other via a sealing member, a liquid crystal layer that is interposed between the first substrate and the second substrate, pixel electrodes that are provided in a display region on the first substrate, a counter electrode that is provided on the first substrate or the second substrate so as to face the pixel electrodes, a first electrode that is provided between the display region and the sealing member in a plan view and is supplied with a first potential, a second electrode that is provided between the first electrode and the sealing member in a plan view and is supplied with a second potential, and a third electrode that is provided between the second electrode and the sealing member in a plan view and is supplied with a third potential, the first electrode, the second electrode, and the third electrode being provided on the first substrate or the second substrate, the method including: applying AC signals with the same frequency to each of the first electrode, the second electrode, and the third electrode such that the second potential shifts from positive polarity or a reference potential to negative polarity after the first potential shifts from the positive polarity or the reference potential to the negative polarity and before the first potential then shifts to the reference potential or the positive polarity, the third potential shifts from the positive polarity or the reference potential to the negative polarity after the second potential shifts to the negative polarity and before the second potential then shifts to the reference potential or the positive polarity, the second potential shifts from the negative polarity or the reference potential to the positive polarity after the first potential shifts from the negative polarity or the reference potential to the positive polarity and before the first potential then shifts to the reference potential or the negative polarity, and the third potential shifts from the negative polarity or the reference potential to the positive polarity after the second potential shifts from the negative polarity or the reference potential to the positive polarity and the second potential then shifts to the reference potential or the negative polarity, in which a width of the third electrode is wider than widths of the first electrode and the second electrode in a direction from an outer edge of the display region toward the sealing member.

According to the method, it is possible to reduce repelling force between the ionic impurities accumulated at the third electrode due to the wider width of the third electrode than the widths of the first electrode and the second electrode and to thereby effectively accumulate the ionic impurities at the third electrode when the ionic impurities, which moves from the display region to the outside of the display region, are accumulated at the third electrode.

That is, it becomes possible to effectively attract the ionic impurities included in the liquid crystal layer from the display region to the outside of the display region. As a result, it is possible to provide a method of driving a liquid crystal device capable of reducing an influence of the ionic impurities included in the liquid crystal layer on the display, such as image persistence.

In the method of driving a liquid crystal device according to the application example, the frequency f (Hz) of the AC signals may satisfy the following equation:

$$f \leq 2\mu VE/np^2$$

where $\mu$ represents mobility (m$^2$/V·s (second)) of ionic impurities in the liquid crystal layer, VE represents an effective voltage (V) of the AC signals, n represents the number of electrodes to which the AC signals are supplied, and p represents an arrangement pitch (m) of the electrodes to which the AC signals are supplied.

A moving velocity of the ionic impurities that moves between the electrodes to which the AC signals are supplied, that is, a period of time related to the movement depends on the mobility of the ionic impurities and a substantial potential difference between the electrodes and varies in inverse proportion to a distance between the electrodes. Therefore, it is preferable to adapt how to generate the electric fields between the electrodes in accordance with the moving velocity of the ionic impurities.

According to the method, it is possible to reliably attract the ionic impurities in the liquid crystal layer from the display region to the outside of the display region since the frequency f (Hz) of the AC signals is the same or decreases with respect to the velocity (time) of the ionic impurities moving the distance corresponding to the arrangement pitch between the electrodes.

In the method of driving a liquid crystal device according to the application example, the AC signals with the same waveform may be applied to each of the first electrode, the second electrode, and the third electrode.

According to the method, it is not necessary to generate the AC signals with different waveforms. Therefore, it is possible to simplify a configuration of a drive circuit.

In the method of driving a liquid crystal device according to the application example, it is preferable that the AC signals have potentials of three or more levels.

According to the method, it is possible to apply potentials of three or more levels to each of the first electrode, the second electrode, and the third electrode. Therefore, it is possible to smoothly move (scroll) the electric fields between the electrodes.

In the method of driving a liquid crystal device according to the application example, the AC signals may have a rectangular waveform.

According to the method, it is possible to generate the electric fields with stable intensity between adjacent electrodes from among the first electrode, the second electrode, and the third electrode and to thereby further effectively attract the ionic impurities. In addition, it is possible to further easily generate the AC signals as compared with a sine wave analog signal, for example.

Application Example

According to this application example, there is provided an electronic apparatus including the liquid crystal device of any one of the aforementioned application examples.

Application Example

According to this application example, there is provided an electronic apparatus including a liquid crystal device that is drive by the method of driving a liquid crystal device of any one of the aforementioned application examples.

According to these application examples, it is possible to provide an electronic apparatus that makes an improvement in display failures due to ionic impurities and has excellent display quality.

BRIEF DESCRIPTION OF THE DRAWINGS

The invention will be described with reference to the accompanying drawings, wherein like numbers reference like elements.

FIG. 3 is an equivalent circuit diagram illustrating an electrical configuration of the liquid crystal device.

DESCRIPTION OF EXEMPLARY EMBODIMENTS

Figure 1:
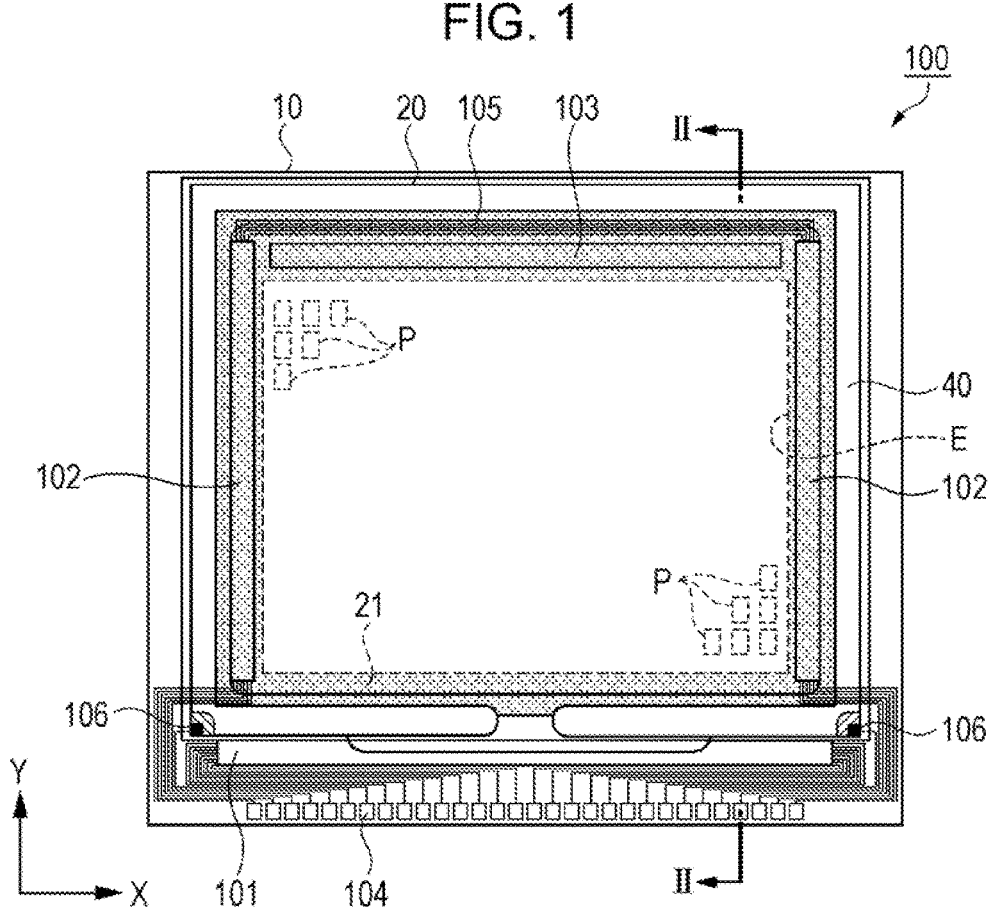
FIG. 1 is a plan view schematically illustrating a configuration of a liquid crystal device according to a first embodiment.

Hereinafter, a description will be given of embodiments in which the invention is realized, with reference to drawings. In the following respective drawings, the respective components are illustrated with sizes that can be recognized in the drawings and dimensions of the respective components are different from actual dimensions in some cases for clear illustration.

In the following embodiments, a description "on a substrate" represents arrangement in contact with the substrate, arrangement over the substrate via another configuration, or an arrangement in which a part of a configuration is in contact with the substrate while another part of the configuration is arranged via another configuration.

First Embodiment

In this embodiment, an active matrix-type liquid crystal that is provided with thin film transistors (TFTs) as switching elements of pixels will be described as an example. The liquid crystal device 100 can be suitably used as a light modulation structure (liquid crystal light valve) of a projection-type display apparatus (liquid crystal projector), which will be described later, for example.

Configuration of Liquid Crystal Device

Figure 2:
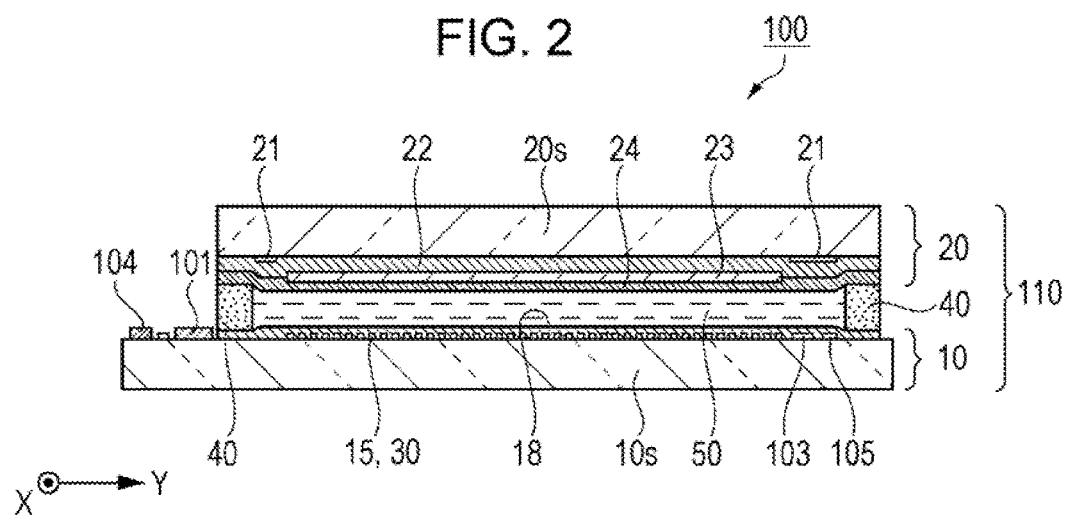
FIG. 2 is a sectional view schematically illustrating the liquid crystal device in FIG. 1, which is taken along the line II-II.

FIG. 1 is a plan view schematically illustrating a configuration of the liquid crystal device 100 according to the first embodiment, and FIG. 2 is a sectional view schematically illustrating the liquid crystal device 100 in FIG. 1 taken along the line II-II. First, a description will be given of the liquid crystal device 100 according to the embodiment with reference to FIGS. 1 and 2.

As illustrated in FIGS. 1 and 2, the liquid crystal device 100 according to the embodiment includes an element substrate 10 and a counter substrate 20 that face each other, and a liquid crystal layer 50 that is interposed between a pair of these substrates. As a base material 10s of the element substrate 10 and a base material 20s of the counter substrate 20, transparent quartz substrates or glass substrates, for example, are used. The element substrate 10 corresponds to the first substrate of the invention, and the counter substrate 20 corresponds to the second substrate of the invention.

The liquid crystal layer 50 is configured such that the element substrate 10 is greater than the counter substrate 20, both the substrates are attached to each other with a gap via a sealing member 40 that is arranged along an outer edge of the counter substrate 20, and liquid crystal with positive or negative dielectric anisotropy is injected into the gap.

As the sealing member 40, a thermosetting or ultraviolet curable adhesive such as epoxy resin is employed. A spacer (not shown in the drawings) for constantly holding the gap between the pair of substrates is mixed into the sealing member 40.

A display region E including a plurality of pixels P that are aligned in a matrix shape is provided inside the sealing member 40. In addition, a parting section 21 is provided between the sealing member 40 and the display region E so as to surround the display region E. The parting section 21 is made of light blocking metal or metal oxide, for example.

The element substrate 10 is provided with a terminal section in which a plurality of terminals 104 for external connection are aligned. A data line driving circuit 101 is provided between a first side along the terminal section and the sealing member 40. In addition, an inspection circuit 103 is provided between the sealing member 40 along a second side that faces the first side and the display region E.

Furthermore, scanning line driving circuits 102 are respectively provided between the sealing member 40 along a third side and a fourth side, which intersect the first side and face each other, and the display region E. A plurality of wirings 105 that connect two scanning line driving circuits 102 are provided between the sealing member 40 of the second side and the inspection circuit 103.

Wirings that are coupled to the data line driving circuit 101 and the scanning line driving circuits 102 are connected to the plurality of terminals 104 for external connection, which are aligned along the first side.

Hereinafter, a description will be given on the assumption that a direction along the first side is an X direction and a direction along the third side is a Y direction. In addition, arrangement of the inspection circuit 103 is not limited thereto, and the inspection circuit 103 may be provided at a position along the inside of the sealing member 40 between the data line driving circuit 101 and the display region E.

As illustrated in FIG. 2, a light transmitting pixel electrode 15 and a thin film transistor 30 (hereinafter, referred to as a TFT 30) as a switching element that are provided for each pixel P, signal wiring, and an orientation film 18 that covers these components are formed on the surface of the element substrate 10 on the side of the liquid crystal layer 50.

The element substrate 10 includes a base material 10s, the pixel electrodes 15 formed on the base material 10s, the TFTs 30, the signal wiring (not shown), and the orientation film 18.

The counter substrate 20 that is arranged so as to face the element substrate 10 includes a base material 20s, the parting section 21 that is formed on the base material 20s, a flattening layer 22 that is formed as a film so as to cover the parting section 21, a common electrode 23 that is provided in the display region E so as to cover the flattening layer 22, and an orientation film 24 that covers the common electrode 23. The common electrode 23 corresponds to the counter electrode of the invention.

The liquid crystal device 100 employs a light blocking structure that prevents light from being incident on semiconductor layers in the TFTs 30 and causing a switching operation to be unstable. Specifically, the parting section 21 is provided at a position at which the parting section 21 surrounds the display region E and overlaps the scanning line driving circuits 102 and the inspection circuit 103 in a plane.

In doing so, the parting section 21 plays a role in blocking light being incident on these circuits from the side of the counter substrate 20 and preventing these circuits from erroneously operating due to the light. The parting section 21 blocks unnecessary stray light so as not to be incident on the display region E and secures high contrast display in the display region E.

The flattening layer 22 is made of an inorganic material such as silicon oxide, has a light transmitting property, and is provided so as to cover the parting section 21. As a method of forming such a flattening layer 22, a method of forming the film by using a plasma CVD method is exemplified.

The common electrode 23 is formed of a transparent conductive film such as indium tin oxide (ITO), covers the flattening layer 22, and is electrically connected to upper and lower conductive sections 106 that are provided at corners of the counter substrate 20 on the lower side. The upper and lower conductive sections 106 are electrically connected to wiring on the side of the element substrate 10.

The orientation film 18 that covers the pixel electrodes 15 and the orientation film 24 that covers the common electrode 23 are selected based on optical design of the liquid crystal device 100. As examples of the orientation films 18 and 24, it is possible to exemplify an organic orientation film treated so as to be substantially horizontally oriented with respect to liquid crystal molecules with the positive dielectric anisotropy by forming a film from an organic material such as polyimide and rubbing the surface thereof, and an inorganic orientation film that is substantially vertically oriented with respect to liquid crystal molecules with the negative dielectric anisotropy by forming a film of an inorganic material such as SiOx (silicon oxide) by a vapor phase deposition method.

According to the embodiment, the orientation films 18 and 24 are groups of columns that are obtained by obliquely depositing an inorganic material such as silicon oxide in a predetermined direction and causing the inorganic material to grow in columnar shapes, for example. The liquid crystal molecules with the negative dielectric anisotropy are substantially vertically oriented (vertical alignment: VA) with respect to such orientation films 18 and 24 with a pre-tilt angle of 3° to 5° in the inclined direction of the columns with respect to a normal direction of the surface of the orientation film.

The liquid crystal molecules behave (oscillate) so as to incline in a direction of an electric field that is caused between the pixel electrodes 15 and the common electrode 23 by applying an AC voltage (drive signal) between the pixel electrodes 15 and the common electrode 23 and driving the liquid crystal layer 50.

Such a liquid crystal device 100 is a transmission type and employs optical design of a normally white mode in which transmittance of the pixels P becomes maximum in a voltage non-application state and of a normally black mode in which transmittance of the pixels P becomes minimum in the voltage non-application state. Polarization elements are arranged on a light incident side and light outgoing side of the liquid crystal panel 110, including the element substrate 10 and the counter substrate 20, in accordance with the optical design.

Hereinafter, an example in which the aforementioned inorganic orientation films as the orientation films 18 and 24 and the liquid crystal with the negative dielectric anisotropy are used and the optical design of the normally black mode is applied will be described in this embodiment.

FIG. 3 is an equivalent circuit diagram illustrating an electrical configuration of the liquid crystal device 100. A description will be given of the electrical configuration of the liquid crystal device 100 with reference to FIG. 3. The liquid crystal device 100 includes a plurality of scanning lines 3a and a plurality of data lines 6a, as signal wirings, that are mutually insulated and perpendicularly intersect each other in at least the display region E and capacitance lines 3b that are arranged in parallel with the data lines 6a. A direction in which the scanning lines 3a extend is an X direction, and a direction in which the data lines 6a extend is a Y direction.

The scanning lines 3a, the data lines 6a, and the capacitance lines 3b, and the pixel electrodes 15, the TFTs 30, and the storage capacitors 16 in regions sectioned by the signal lines are provided and configure the pixel circuits of the pixels P.

The scanning lines 3a are electrically connected to gates of the TFTs 30, and the data lines 6a are electrically connected to sources of the TFTs 30. The pixel electrodes 15 are electrically connected to drains of the TFTs 30.

The data lines 6a are connected to the data line driving circuit 101 (see FIGS. 1 and 2) and supply image signals D1, D2, . . . , Dn, which are supplied from the data line driving circuit 101, to the pixels P. The scanning lines 3a are connected to the scanning line driving circuits 102 (see FIG. 1), and supplies scanning signals SC1, SC2, . . . , SCm that are supplied from the scanning line driving circuits 102 to the pixels P.

The image signals D1 to Dn that are supplied from the data line driving circuit 101 to the data lines 6a may be sequentially supplied in this order, or may be supplied to each group of a plurality of mutually adjacent data lines 6a. The scanning line driving circuits 102 sequentially supply the scanning signals SC1 to SCm to the scanning lines 3a in a pulse-like manner at predetermined timing.

The liquid crystal device 100 is configured such that the image signals D1 to Dn supplied from the data lines 6a are written in the pixel electrodes 15 at predetermined timing by the TFTs 30 as switching elements being turned into an ON state only for a predetermined period of time by the input of the scanning signals SC1 to SCm.

In addition, the image signals D1 to Dn at a predetermined level, which are written in the liquid crystal layer 50 via the pixel electrodes 15, are held for a predetermined period of time between the pixel electrodes 15 and the common electrodes 23 that are arranged so as to face the pixel electrodes 15 via the liquid crystal layer 50. A frequency of the image signals D1 to Dn is 60 Hz, for example.

In order to prevent the held image signals D1 to Dn from leaking, the storage capacitors 16 are connected in parallel with the liquid crystal capacitors that are formed between the pixel electrodes 15 and the common electrode 23. The storage capacitors 16 are provided between the drains of the TFTs 30 and the capacitance lines 3b.

The data lines 6a are connected to the inspection circuit 103 illustrated in FIG. 1, and the inspection circuit 103 is configured so as to be able to check operation failures and the like of the liquid crystal device 100 by detecting the aforementioned image signals in the process of manufacturing the liquid crystal device 100. However, illustration is omitted in the equivalent circuit of FIG. 3.

A peripheral circuit that drives and controls the pixel circuit in the embodiment includes the data line driving circuit 101, the scanning line driving circuits 102, and the inspection circuit 103. In addition, the peripheral circuit may include a sampling circuit that samples the aforementioned image signals and supplies the image signals to the data lines 6a and a pre-charge circuit that supplies pre-charge signals at a predetermined voltage level to the data lines 6a prior to the aforementioned image signals.

Orientation State of Liquid Crystal Molecules

Figure 4A:
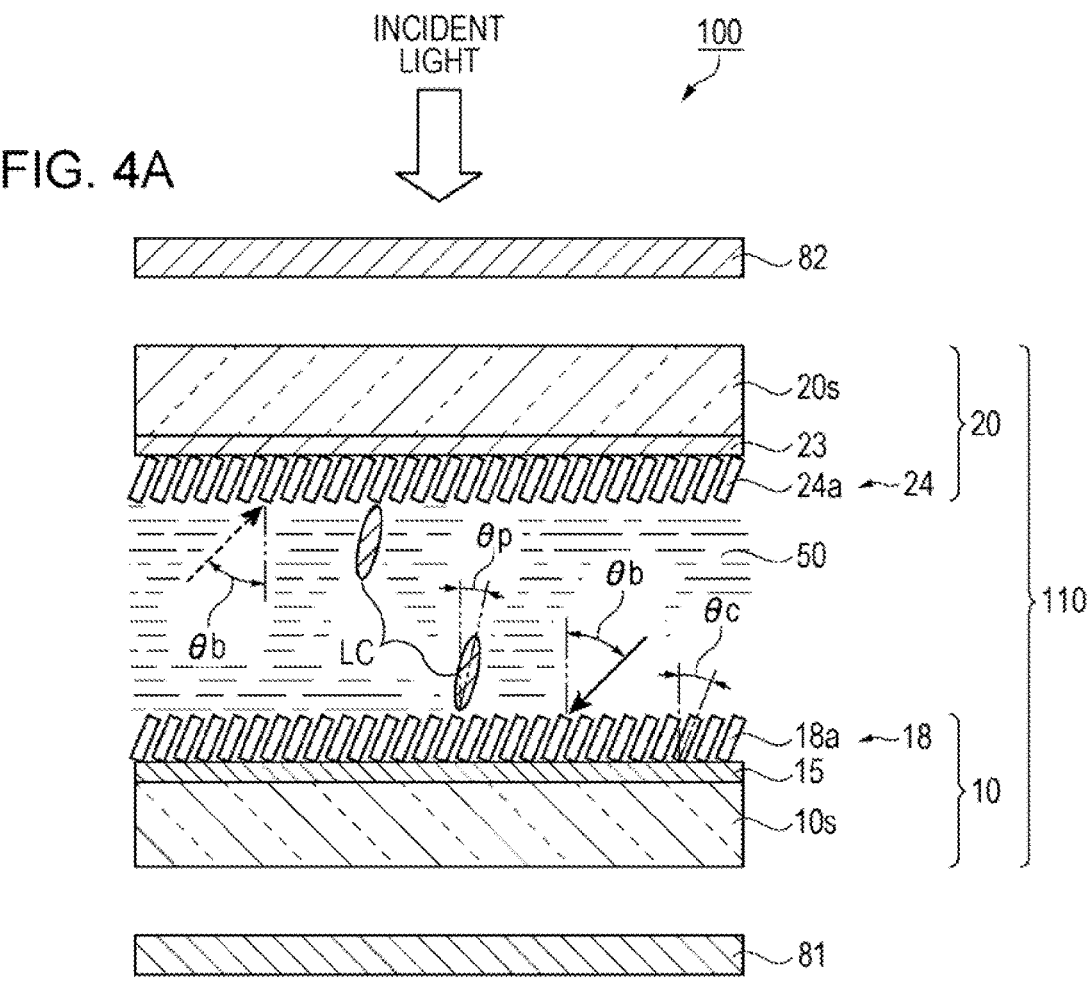
FIG. 4A is a sectional view schematically illustrating a formation state of an inorganic orientation film and an orientation state of liquid crystal molecules.
Figure 4B:
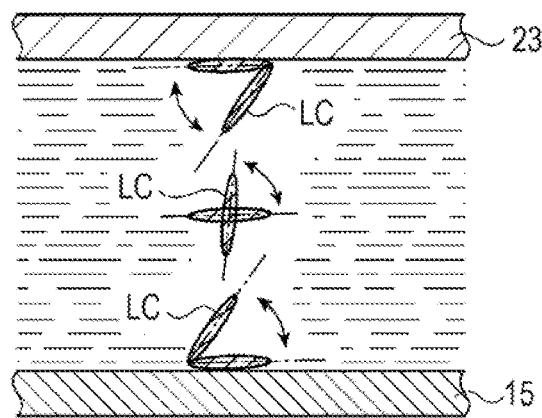
FIG. 4B is a sectional view schematically illustrating a behavior of the liquid crystal molecules.

Next, a description will be given of an orientation state of liquid crystal molecules LC in the liquid crystal device 100 with reference to FIGS. 4A and 4B. FIG. 4A is a sectional view schematically illustrating a formation state of the inorganic orientation film and an orientation state of the liquid crystal molecules LC in the liquid crystal device 100, and FIG. 4B is a sectional view schematically illustrating a behavior of the liquid crystal molecules LC.

As illustrated in FIG. 4A, the orientation film 18 and the orientation film 24 that are obtained by obliquely depositing silicon oxide by a vacuum deposition method, as an example of physical vapor phase deposition methods, are formed on the surfaces of the pixel electrodes 15 and the common electrode 23 in the liquid crystal device 100. Specifically, a deposition angle θb with respect to normal lines of the surfaces of the element substrate 10 and the counter substrate 20 that face the liquid crystal layer 50 is approximately 45°.

By such an oblique deposition, liquid crystal bodies of silicon oxide grow in columnar shapes on the surfaces of the substrates in the deposition direction. Such liquid crystal bodies with columnar shapes will be referred to as columns 18a and 24a. The orientation films 18 and 24 are groups of such columns 18a and 24a.

An angle θc of a growth direction of the columns 18a and 24a with respect to the normal lines of the surfaces of the substrates does not necessarily coincide with the deposition angle θb and is approximately 20°. A pre-tilt angle θp of the vertically oriented liquid crystal molecules LC is approximately 3° to 5° on the surfaces of the orientation films 18 and 24.

In addition, the pre-tilt direction in which the liquid crystal molecules LC viewed from the normal line direction of the substrate surfaces is inclined, that is, the inclination direction of the liquid crystal molecules LC is the same as a deposition direction, in a plan view, of the oblique deposition of the orientation films 18 and 24. The aforementioned inclination direction in the vertical orientation processing is appropriately set based on optical design conditions of the liquid crystal device 100.

The oriented state in which the liquid crystal molecules LC with the negative dielectric anisotropy stands while tilting with the pre-tilt angle θp with respect to the orientation film surfaces as described above will be referred to as substantially vertical orientation.

A portion including the element substrate 10 and the counter substrate 20, which are arranged so as to face each other, and the liquid crystal layer 50 interposed between the pair of substrates will be referred to as the liquid crystal panel 110. The liquid crystal device 100 includes polarization elements 81 and 82 respectively arranged on a light incident side and a light outgoing side of the liquid crystal panel 110.

In addition, the polarization elements 81 and 82 are arranged on the liquid crystal panel 110 such that a transmission axis or an absorption axis of one of the polarization elements 81 and 82 is parallel with the X direction or the Y direction and transmission axes or absorption axes thereof perpendicularly intersect each other.

In the embodiment, the substantially vertical orientation processing is performed such that the orientation of the pre-tilting of the liquid crystal molecules LC intersects the transmission axes or the absorption axes of the polarization elements 81 and 82 at 45° in the display region E. Therefore, the optical arrangement as illustrated in FIG. 4B is employed so as to obtain high transmittance by the liquid crystal molecules LC tilting in the inclination direction of the pre-tilting when a drive voltage is applied between the pixel electrodes 15 and the common electrode 23 and driving the liquid crystal layer 50.

If the liquid crystal layer 50 is repeatedly driven (ON/OFF), the liquid crystal molecules LC repeats behaviors of tilting in the inclination direction of the pre-tilting and returning to the initial orientation state. The substantially vertical orientation processing of casing such behaviors of the liquid crystal molecules LC will be referred to as mono-axial substantially vertical orientation processing.

The direction in which the light is incident on the liquid crystal panel 110 is not limited to the incident direction from the side of the counter substrate 20 as illustrated in FIG. 4A. Alternatively, another configuration may be employed in which an optical compensation element such as a phase difference plate is provided on the light incident side or the light outgoing side.

Variations in Display Due to Ionic Impurities

Figure 5:
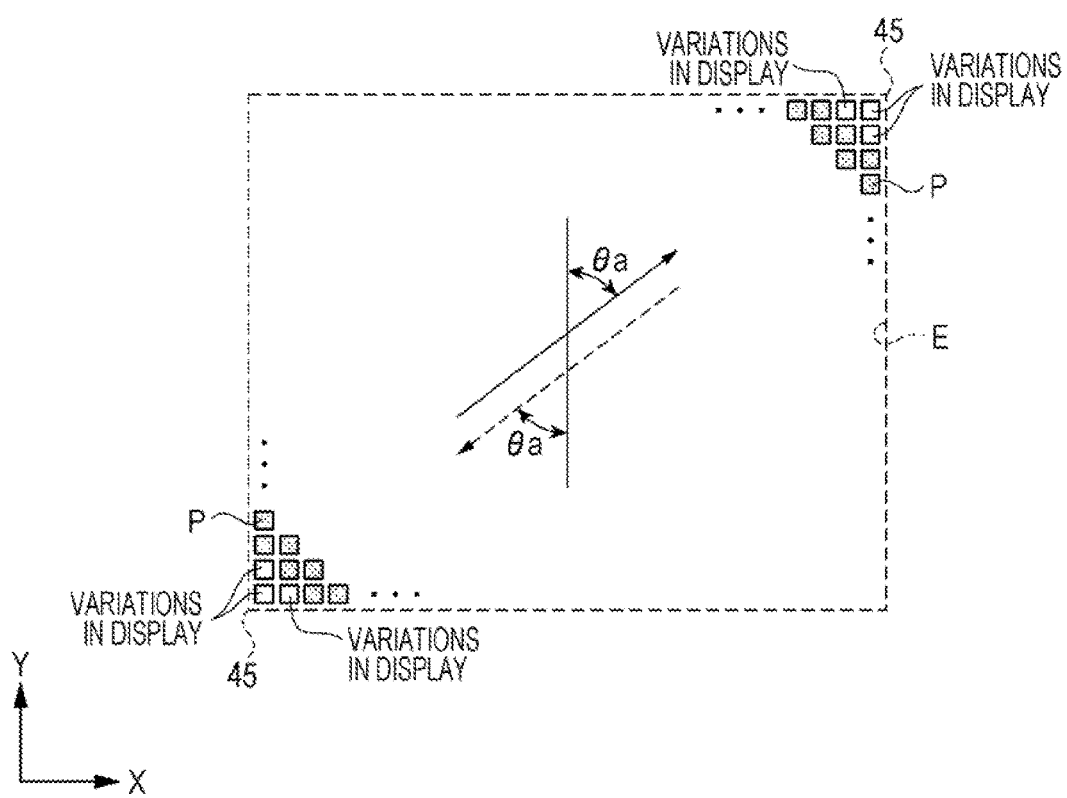
FIG. 5 is a plan view schematically illustrating a relationship between an oblique deposition direction of an inorganic material and variations in display due to ionic impurities.

Next, a description will be given of variations in display due to ionic impurities, which are to be solved by the invention, with reference to FIG. 5. FIG. 5 is a plan view schematically illustrating a relationship between the oblique deposition direction of the inorganic material and variations in display due to ionic impurities.

The oblique deposition direction of the inorganic material forming the columns 13a and 24a is a direction intersecting the Y direction at a predetermined orientation angle θa from the upper right side toward the lower left side as illustrated by the arrow of the broken line on the side of the element substrate 10 as illustrated in FIG. 5, for example.

The oblique deposition direction is a direction intersecting the Y direction at the predetermined orientation angle θa from the lower left side toward the upper right side as illustrated by the arrow of the solid line on the side of the counter substrate 20 that is arranged so as to face the element substrate 10. The predetermined orientation angle θa is 45°, for example. In addition, the oblique deposition direction illustrated in FIG. 5 is a direction when the liquid crystal panel 110 is viewed from the side of the counter substrate 20.

Driving of the liquid crystal layer 50 causes the behavior (oscillation) of the liquid crystal molecules LC, and a flow of the liquid crystal molecules LC is generated in the oblique deposition direction illustrated by the arrow of the broken line or the solid line in FIG. 5 in the vicinity of interfaces between the liquid crystal layer 50 and the orientation films 18 and 24. If the liquid crystal layer 50 includes ionic impurities with the positive polarity or the negative polarity, the ionic impurities move toward the lower left and upper right corners 45 of the display region E along the flow of the liquid crystal molecules IC.

A decrease in insulation resistance of the liquid crystal layer 50 at the pixels P positioned in the periphery of the corners 45 due to ionic impurities brings about a decrease in a driving potential at the pixels P and causes a significant image persistence phenomenon due to variations in display and energization. If the inorganic orientation films are used as the orientation films 18 and 24, in particular, the inorganic orientation films easily adsorb the ionic impurities. Therefore, variations in display and the image persistence phenomenon outstandingly appear as compared with the case of using organic orientation films.

In the case of normally black, for example, the pixels P positioned in the periphery of the corners 45 causes a decrease in the driving potential and light leakage due to eccentrically located ionic impurities, and causes a decrease in contrast. FIG. 5 shows a state in which light leakage occurs at three pixels P positioned in the periphery of the corners 45 of the display region E.

The orientation angle θa may be 450 inclined toward the lower right side instead of 45° inclined toward the upper right side as illustrated in FIG. 5. In such a case, variations in display occur in the upper left and lower right corners 45 of the display region E. That is, the orientation direction θa of the liquid crystal molecules LC when the driving voltage is provided to the liquid crystal layer 50 is the flowing direction of the liquid crystal molecules LC.

Since the thickness of the liquid crystal layer 50 ranges from about 1 μm to about 3 μm depending on the optical design conditions of the liquid crystal panel 110, the flow of the liquid crystal molecules LC strongly occurs in the vicinity of the surfaces of the respective orientation films 18 and 24. Therefore, the flowing direction of the liquid crystal molecules LC on the side of the element substrate 10 is opposite to that on the side of the counter substrate 20.

The liquid crystal device 100 according to the embodiment includes an ion trap mechanism provided between the sealing member 40 and the display region E so as to be able to draw the ionic impurities from the display region E in order to improve the variations in display and the image persistence phenomenon. Hereinafter, a description will be given of the ion trap mechanism according to the embodiment with reference to FIGS. 6 and 7.

Ion Trap Mechanism

Figure 6:
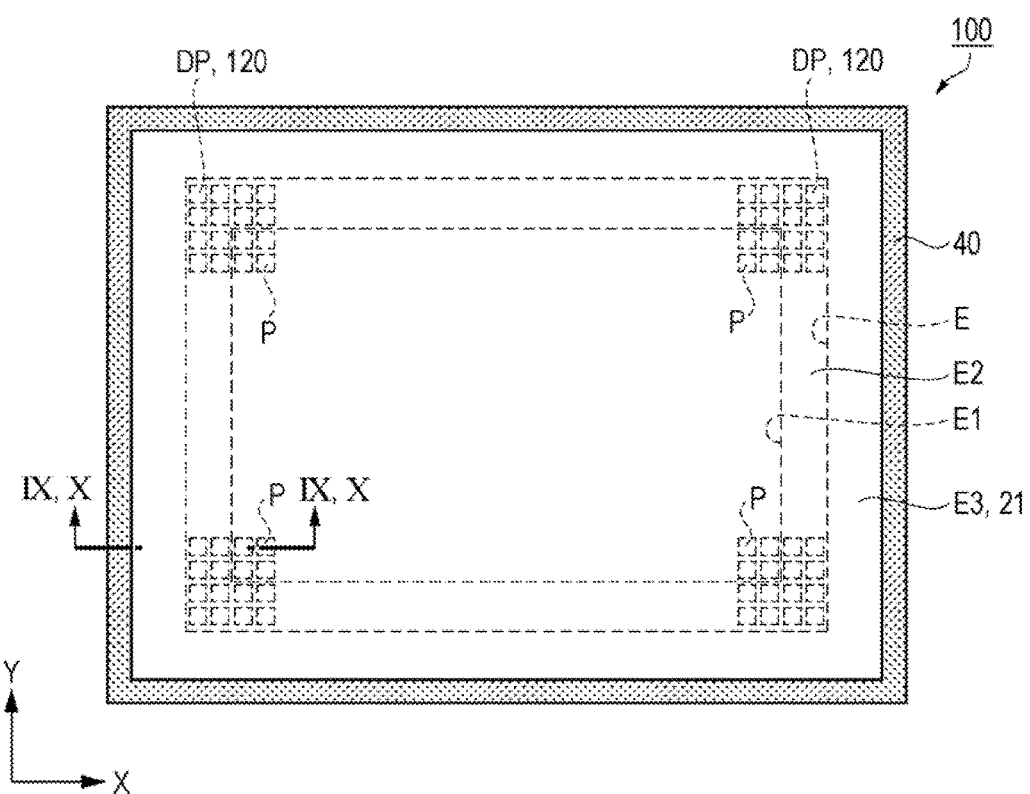
FIG. 6 is a plan view schematically illustrating arrangement of pixels that contribute to display and dummy pixels.
Figure 7:
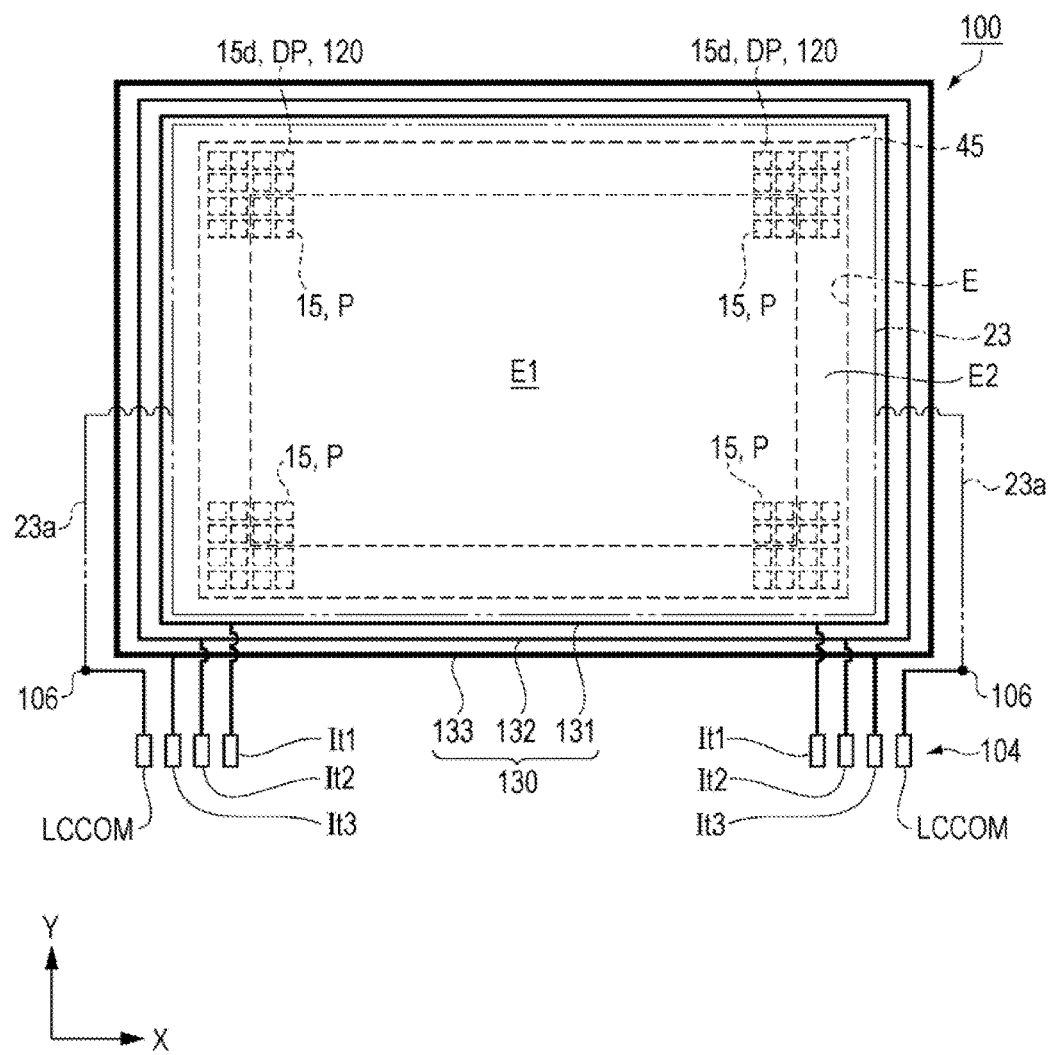
FIG. 7 is a wiring diagram of an electronic parting section and an ion trap mechanism.

FIG. 6 is a plan view schematically illustrating arrangement of the pixels P that contribute to display and dummy pixels DP, and FIG. 7 is a wiring diagram of the electronic parting section 120 and the ion trap mechanism.

As illustrated in FIG. 6. the display region E of the liquid crystal device 100 according to the embodiment includes an actual display region E1 in which a plurality of pixels P that contribute to display are arranged and a dummy pixel region E2 including a plurality of dummy pixels DP provided so as to surround the actual display region E1.

The aforementioned parting section 21 with the light blocking property is provided between the region in which the sealing member 40 is arranged in a frame shape and the dummy pixel region E2, and the region in which the parting section 21 is provided is a parting region E3 that does not depend on ON and OFF states of the liquid crystal device 100.

In the dummy pixel region E2, two dummy pixels DP are arranged on each of opposite sides in the X direction with the actual display region E1 interposed therebetween, and two dummy pixels DP are arranged on each of opposite sides in the Y direction with the actual display region E1 interposed therebetween. In addition, the number of dummy pixels DP arranged in the dummy pixel region E2 is not limited thereto, and at least one dummy pixel DP may be arranged on each of opposite sides in the X and Y directions with the actual display region E1 interposed therebetween.

In addition, three or more dummy pixels DP may be arranged on each of opposite sides, or the number of dummy pixels arranged in the X direction may be different from that in the Y direction. Since the dummy pixels DP are made to function as an electronic parting section in the embodiment, the plurality of dummy pixels DP will be referred with a reference numeral 120 as an electronic parting section 120 in some cases.

As illustrated in FIG. 7, the ion trap mechanism according to the embodiment includes ion trap electrodes 130 provided in a ring shape (frame shape) so as to surround the display region E.

The ion trap electrodes 130 include three electrodes, namely a first electrode 131, a second electrode 132, and a third electrode 133 which are electrically independent, and the first electrode 131, the second electrode 132, and the third electrode 133 are arranged at further locations from the display region E in this order. That is, the third electrode 133 is arranged as the outermost peripheral electrode.

In the embodiment, the width L1 of the first electrode 131 is the same as the width L2 of the second electrode 132 in a direction from the outer edge of the display region E toward the outside of the display region E (the sealing member 40 illustrated in FIG. 6), and the width L3 of the third electrode 133 is greater than L1 and L2. The details of L, L2, and L3 will be described later, and illustration is omitted in FIG. 7.

The ion trap mechanism attracts the ionic impurities, which are eccentrically located in the periphery of the corners 45 of the display region E to the outside of the display region E by the first electrode 131, the second electrode 132, and the third electrode 133 (hereinafter, these electrodes will be collectively referred to as ion trap electrodes 130 in some cases).

The first electrode 131 is electrically connected to a terminal 104 (It1) for external connection to which a first potential as a signal for ion trapping is supplied. The second electrode 132 is electrically connected to a terminal 104 (It2) for external connection to which a second potential as a signal for ion trapping is supplied. The third electrode 133 is electrically connected to a terminal 104 (It3) for external connection to which a third potential as a signal for ion trapping is supplied.

In addition, the plurality of dummy pixels DP arranged so as to surround the actual display region E1 along the edge of the actual display region E1 includes dummy pixel electrodes 15d.

From among the plurality of terminals 104 for external connection, the respective terminals 104 for external connection provided on the sides of the opposite ends in the X axis direction are electrically connected to the upper and lower conductive sections 106. The common electrode 23 is also electrically connected to the upper and lower conductive sections 106 via wiring 23a.

A common potential (LCCOM) is provided to the terminals 104 for external connection. That is, common potential is applied to the common electrode 23.

Although a configuration of supplying a potential from the respective two terminals 104 (It1, It2, and IT3) for external connection is employed in order to reduce variations in potential to be provided to the first electrode 131, the second electrode 132, and the third electrode 133 depending on the positions of the first electrode 131, the second electrode 132, and the third electrode 133 on the element substrate 10 in this embodiment, the invention is not limited thereto.

In other words, the terminals 104 (It1, It2, and It3) for external connection may be arranged one by one, or three or more terminals 104 for external connection may be arranged together.

Each of the first electrode 131, the second electrode 132, and the third electrode 133 in the ion trap electrodes 130 has one end connected to routed wiring and the other end in an opened state.

Method of Driving Liquid Crystal Electrode

Figure 8:
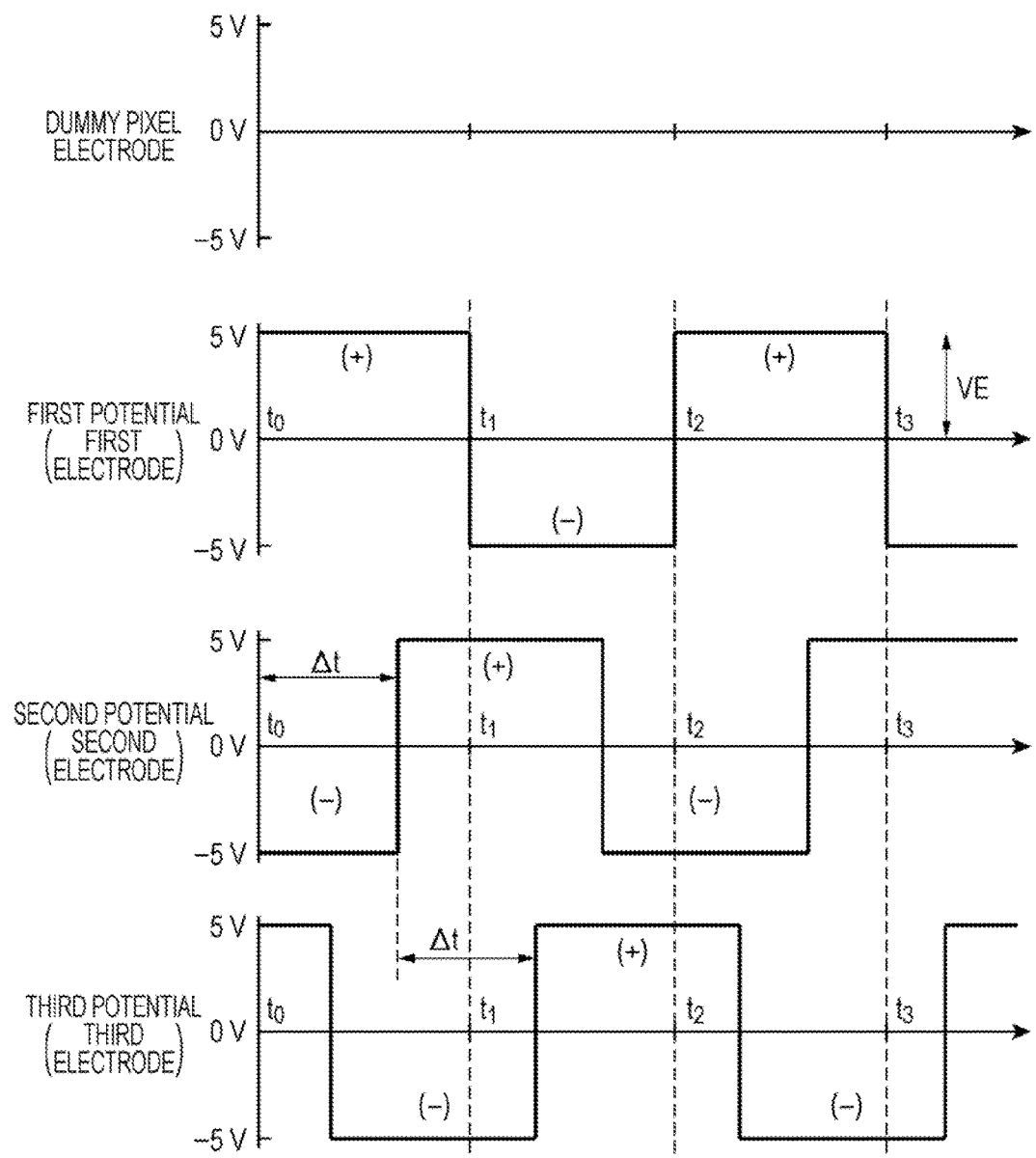
FIG. 8 is a timing chart illustrating waveforms of AC signals with rectangular waves that are applied to a first electrode, a second electrode, a third electrode, and dummy pixel electrodes in the ion trap mechanism.

FIG. 8 is a timing chart illustrating waveforms of AC signals with rectangular waves applied to the first electrode 131, the second electrode 132, the third electrode 133, and the dummy pixel electrodes 15*d* in the ion trap mechanism. AC signals applied to the first electrode 131, the second electrode 132, and the third electrode 133, respectively will be specifically exemplified, and a description will be given of a method of driving the liquid crystal device 100 with reference to FIG. 8.

According to the method of driving the liquid crystal device 100 in the embodiment, the potential of the common electrode 23 and a reference potential are set to 0 V, for example, and the same potential (0 V, for example) as the potential of the common electrode 23 is applied to the dummy pixel electrode 15*d* in a display period during which the pixel electrode 15 is driven, as illustrated in FIG. 8.

Then, AC signals of rectangular waves with the same waveform, potentials of which vary between positive polarity (+) of 5 V and negative polarity (−) of −5 V with respect to the reference potential (0 V), are respectively applied to the first electrode 131, the second electrode 132, and the third electrode 133 for one cycle from time $t_0$ to time $t_2$.

Although the rectangular waves illustrated in FIG. 8 shift to a high potential (5 V) and a low potential (−5 V) with respect to 0 V as a reference potential, setting of the reference potential, the high potential, and the low potential is not limited thereto.

A specific description will be given of the method of driving the liquid crystal device 100. The AC signals with the same frequency are applied to each of the first electrode 131, the second electrode 132, and the third electrode 133 such that the second potential shifts from positive polarity or the reference potential to negative polarity after the first potential shifts from the positive polarity or the reference potential to the negative polarity and before the first potential then shifts to the reference potential or the positive polarity, the third potential shifts from the positive polarity or the reference potential to the negative polarity after the second potential shifts to the negative polarity and before the second potential then shifts to the reference potential or the positive polarity, the second potential shifts from the negative polarity or the reference potential to the positive polarity after the first potential shifts from the negative polarity or the reference potential to the positive polarity and before the first potential then shifts to the reference potential or the negative polarity, and the third potential shifts from the negative polarity or the reference potential to the positive polarity after the second potential shifts from the negative polarity or the reference potential to the positive polarity and the second potential then shifts to the reference potential or the negative polarity.

At this time, a rectangular wave with a phase deviated from that of the first electrode 131 by Δt is applied to the second electrode 132, and a rectangular wave with a phase deviated from that of the second electrode 132 by Δt is applied to the third electrode 133. The phase difference Δt of the rectangular waves is a value obtained by dividing one cycle of the AC signal by the number n of electrodes. Since the number of electrodes is three in the embodiment, Δt is 1/3 cycles.

In a period of time corresponding to one cycle of the AC signals from the time to $t_0$ the time $t_2$, distribution of electric fields among the first electrode 131, the second electrode 132, and the third electrode 133 is scrolled (moved) form the first electrode 131 to the third electrode 133 with elapse of time. Such a way of causing traverse electric fields by the AC signals will be referred to as "electric field scrolling".

Frequency of AC Signals

In order to reliably attract the ionic impurities from the display region E to the ion trap electrodes 130 arranged outside the display region E, it is preferable to slowly scroll the electric fields that are caused between adjacent ion trap electrodes 130. That is, a frequency f (Hz) of the AC signals applied to the ion trap electrodes 130 is preferably smaller than a frequency of a drive signal for driving the pixels P.

The present inventors found out a preferable frequency f (Hz) of the AC signals for the ion trap electrodes 130 according to the embodiment as follows.

The moving velocity v (m/s (second)) of the ionic impurities in the liquid crystal layer is provided as a product of electric field intensity e (V/m) between adjacent ion trap electrodes 130 and mobility μ ($m^2$/V·s (second)) of the ionic impurities as represented by Equation (1).

That is, $v = e \times \mu$  (1).

The electric field intensity e (V/m) is a value obtained by dividing a potential difference Vn between the adjacent ion trap electrodes 130 by an arrangement pitch p (m) of the ion trap electrodes 130 as represented by Equation (2).

That is, $e = Vn/p$  (2).

Since the potential difference Vn between the adjacent ion trap electrodes 130 corresponds to the double of the effective voltage VE of the AC signals, the following equation (3) is obtained.

That is, $e = 2VE/p$  (3).

As illustrated in FIG. 8, the effective voltage VE of the AC signals of the rectangular waves corresponds to a potential with respect to the reference potential of the rectangular waves and is 5 V in the embodiment.

By substituting Equation (3) into Equation (1), the moving velocity v (m/s) of the ionic impurities is represented by Equation (4).

That is, $v = 2\mu VE/p$  (4).

Time td required for the ionic impurities to move between the adjacent ion trap electrodes 130 is a value obtained by dividing the arrangement pitch p of the ion trap electrodes 130 by the moving velocity v of the ionic impurities as represented by Equation (5).

That is, $td = p/v = p^2/2\mu VE$  (5).

Therefore, the preferable frequency f (Hz) is obtained by scrolling the electric fields in accordance with the time td required for the ionic impurities to move between the adjacent ion trap electrodes 130.

Since the electric field scrolling time corresponds to the phase difference Δt of the AC signals, the preferable frequency f (Hz) of the AC signals applied to the ion trap electrodes 130 is obtained by the following Equation (6) where the phase difference Δt is assumed to be 1/n cycles and n is assumed to be the number of the ion trap electrodes 130.

That is, $f = 1/n/td = 2\mu VE/np^2$  (6).

If the phase difference Δt of the AC signals applied to the adjacent ion trap electrodes 130 is assumed to be 1/3 cycles, for example, as illustrated in FIG. 8, the potential difference V between the adjacent ion trap electrodes 130 in the embodiment is 10 V in the case of the AC signals of rectangular waves that shift to 5 V and −5 V with respect to 0 V as the reference potential.

If it is assumed that the width L1 of the first electrode 131 and the width L2 of the second electrode 132 are 4 μm, for example, the arrangement pitch p of the ion trap electrodes 130 is 8 μm, for example, and the mobility μ of the ionic impurities is $2.2 \times 10^{-10}$ (m$^2$/V·s), the preferable frequency f is approximately 12 Hz according to Equation (6). If the arrangement pitch p is set to be smaller than 8 μm, the ion frequency f becomes greater than 12 Hz.

The value of mobility μ of the ionic impurities is described in A. Sawada, A. Manabe, and S. Naemura, "A Comparative Study on the Attributes of Ions in Nematic and Isotropic Phases", Jpn. J. Appl Phys Vol. 40, p. 220 to p. 224 (2001), for example.

In a case in which the electric field scrolling velocity is higher than the moving velocity of the ionic impurities and the frequency f of the AC signals is set to be greater than 12 Hz, there is a concern that the ionic impurities cannot follow the electric field scrolling and the effect of attracting the ionic impurities deteriorates. Therefore, the frequency f is preferably equal to or less than 12 Hz.

In contrast, an excessive decrease in the frequency f is not preferable since there is a concern that the decrease brings about a state in which a DC-like potential (gradient) is applied between the ion trap electrodes 130 for a long period of time and defects such as decomposition of liquid crystal, image persistence, and display spot may occur.

In order to reliably attract the ionic impurities to the third electrode 133 along with the electric field scrolling, it is necessary to set the frequency of the AC signals in consideration of the moving velocity of the ionic impurities as described above.

In order to attract the ionic impurities from the display region E to a further location, it is preferable to increase the number n of the ion trap electrodes 130 from three to four or more. In a case in which the number of the ion trap electrodes 130 is four or more, the width of the ion trap electrode arranged at the outermost periphery when viewed from the display region E is preferably greater than the widths of the other ion trap electrodes in a direction from the outer edge of the display region E toward the outside of the display region E.

In addition, there is a concern that the liquid crystal layer 50 includes ionic impurities with the positive polarity and the negative polarity in the process of manufacturing the liquid crystal device 100, and it is known that the ionic impurities with the positive polarity further degrade display quality as compared with the ionic impurities with the negative polarity.

Therefore, although the time from $t_0$ to $t_1$ during which the first potential has positive polarity and the time from $t_1$ to $t_2$ during which the first potential has negative polarity are the same in relation to the AC signals of the rectangular waves in FIG. 8, the invention is not limited to the configuration in which the time from $t_0$ to $t_1$ is the same as the time from $t_1$ to $t_2$.

For example, it is possible to positively attract the ionic impurities with the positive polarity to the respective ion trap electrodes 130 by applying the AC signals, which is configured such that the time during which the first potential has the positive polarity is longer than the time during which the first potential has the negative polarity, for example, to the ion trap electrode 130.

Although the AC signals of the rectangular waves may be made to have amplitude between two potentials, namely 5 V and −5 V with reference to 0 V as a reference potential, waveforms may be set so as to shift among potentials of three or more different levels.

In doing so, it is possible to smoothly scroll the electric fields caused among the ion trap electrodes 130 and to thereby readily move the ionic impurities from the first electrode 131 to the third electrode 133 via the second electrode 132.

In addition, the invention is not limited to the configuration in which the AC signals applied to the respective ion trap electrodes 130 are rectangular waves, and the AC signals may be sine waves or triangular waves with mutually different phases in a period of time corresponding to one cycle. It is possible to further simplify a configuration of a digital circuit for generating the rectangular waves than that of an analog circuit for generating analog signals such as sine waves.

The magnitude of the amplitude of the AC signals applied to the first electrode 131, the second electrode 132, and the third electrode 133, namely the maximum potential with the positive polarity and the maximum potential with the negative polarity with respect to the reference potential may not necessarily be the same as long as the frequency of the AC signals are the same.

Specifically, the AC signal with amplitude between 5 V and −5 V with respect to 0 V as the reference potential is provided to the first electrode 131 as described above. In contrast, the AC signal with amplitude between 7.5 V and −7.5 V with respect to 0 V as the reference potential may be provided to the second electrode 132, and the AC signal with amplitude between 10 V and −10 V with respect to 0 V as the reference potential may be provided to the third electrode 133.

By increasing the magnitude of the amplitude of the AC signals applied to the three ion trap electrodes 130 as the distance from the display region E increases, it is possible to effectively attract the ionic impurities toward the third electrode 133.

Ion Trap Electrodes

Figure 9:
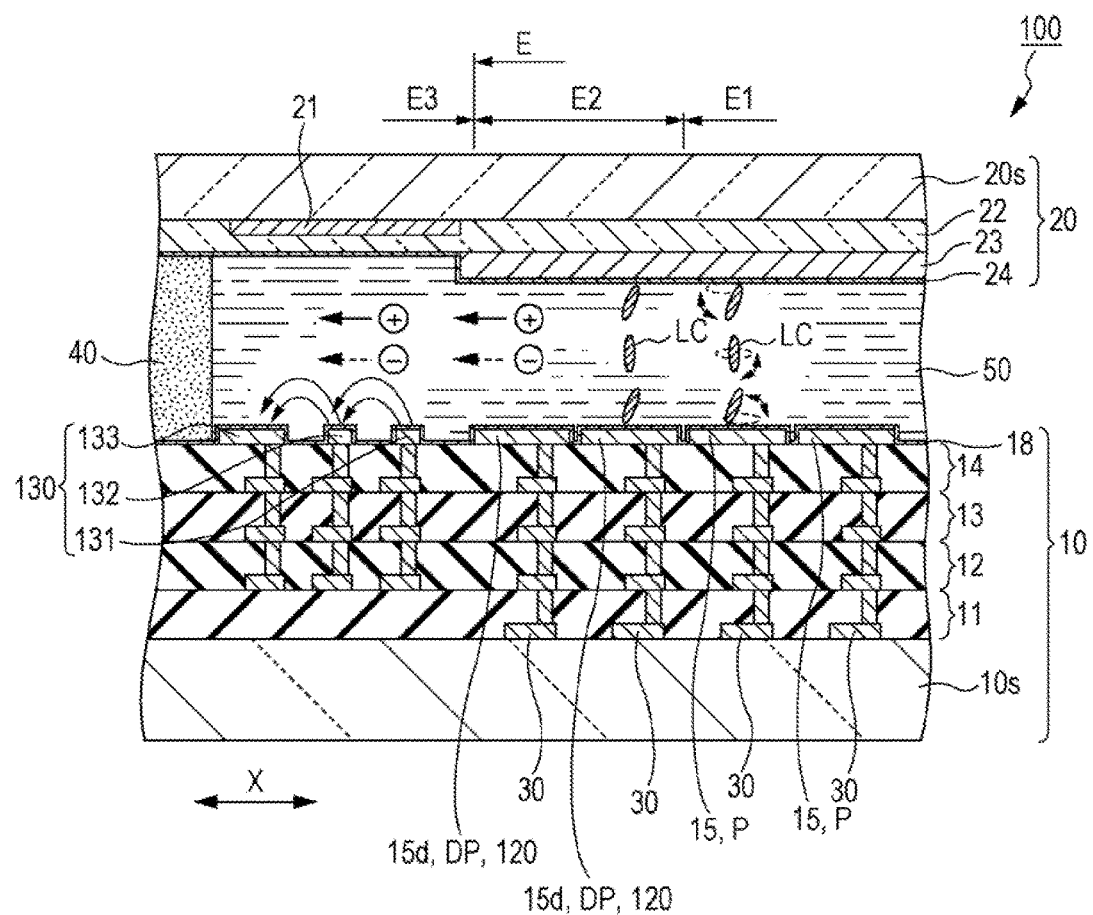
FIG. 9 is a sectional view of main portions, which illustrates a structure of the ion trap mechanism in the liquid crystal device taken along the line IX-IX in FIG. 6.
Figure 10:
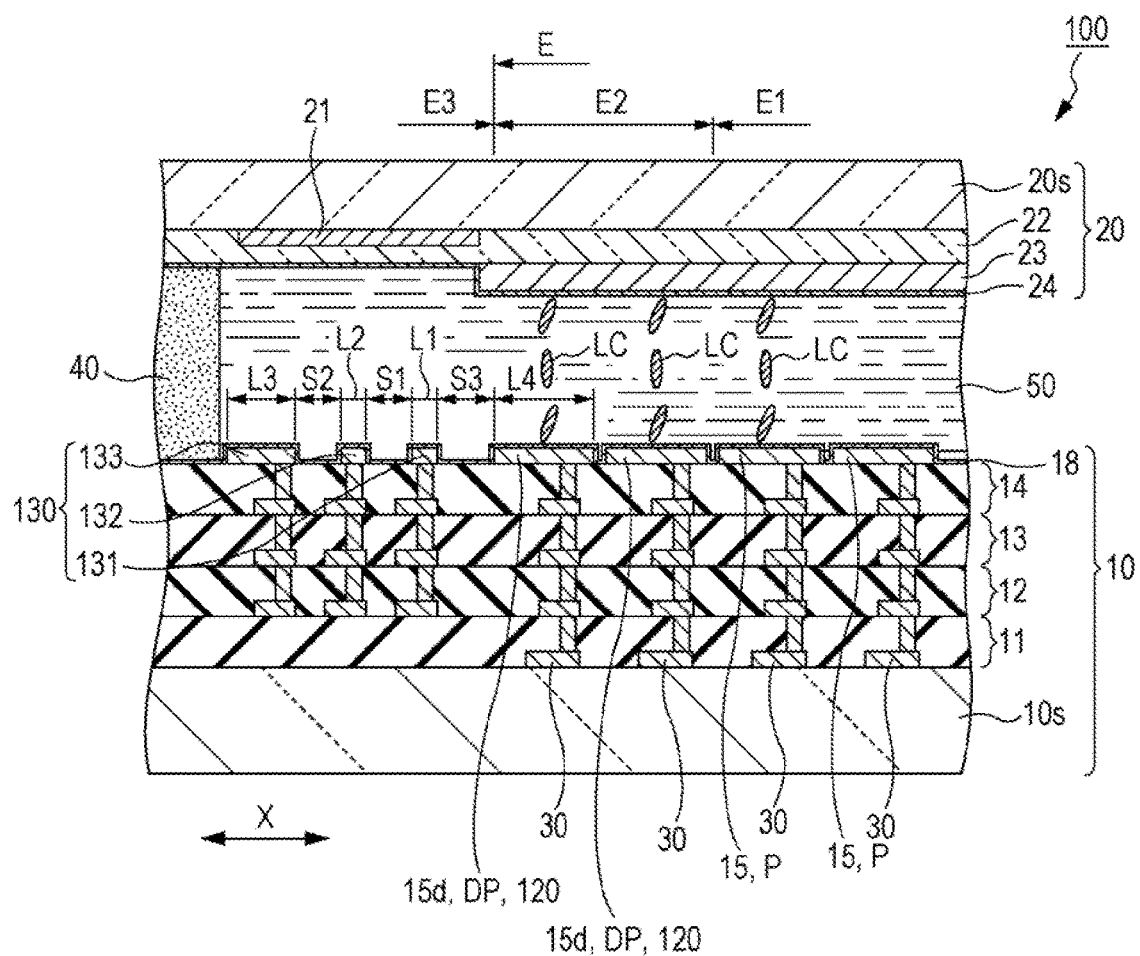
FIG. 10 is a sectional view of main portions, which illustrates a structure of the ion trap mechanism in the liquid crystal device taken along the line X-X in FIG. 6.

FIGS. 9 and 10 are sectional views of main portions illustrating a structure of the ion trap mechanism in the liquid crystal device 100 taken along the line IX-IX in FIG. 6.

As illustrated in FIGS. 9 and 10, the element substrate 10 of the liquid crystal device 100 includes a plurality of wiring layers 11 to 14 on the base material 10s. The pixel electrodes 15 of the pixels P, the dummy pixel electrodes 15d of the dummy pixels DP (electronic parting section 120), the first electrode 131, the second electrode 132, and the third electrode 133 (ion trap electrodes 130) are respectively formed on the wiring layer 14.

The common electrode 23 is provided on the counter substrate 20 so as to face the plurality of pixel electrodes 15 in the display region E and the dummy pixel electrodes 15d, and an outer edge of the common electrode 23 is positioned between the first electrode 131 and the outer edge of the display region E in a plan view. That is, the common electrode 23 is arranged so as not to overlap the ion trap electrode 130.

The dummy pixel electrodes 15d and the ion trap electrodes 130 are formed by using the same transparent conductive films as that of the pixel electrodes 15, for example ITO films in a process of forming the pixel electrodes 15. The planar shape, the size, and the arrangement pitch of the dummy pixel electrodes 15d are the same as those of the pixel electrodes 15.

The ion trap electrodes 130 are arranged at an equal distance in the X direction. Although not shown in FIGS. 9 and 10, the ion trap electrodes 130 are also arranged at an equal distance in the Y direction, are connected to wiring provided on the lower wiring layers 11 to 13, and are led to the terminals for external connection, respectively.

The dummy pixel electrodes 15d are electrically connected to the TFTs 30 that are provided on the wiring layer 11. In the case in which the liquid crystal device 100 is in the normally black mode, the electronic parting section 120 is always set in the "black mode (black display)" regardless of a display state of the pixels P in the actual display region E1. Therefore, an AC potential to such an extent that the transmittance of the dummy pixels DP does not change, for example, is applied to the plurality of dummy pixel electrodes 15d via the TFTs 30.

Here, there is a possibility that ionic impurities with the positive polarity (+) and ionic impurities with the negative polarity (−) are present. Therefore, the ionic impurities with the positive polarity or the negative polarity are attracted to the first electrode 131 in accordance with the polarity of the first potential of the first electrode 131.

If the ionic impurities that have been attracted to the first electrode 131 are made to stay, the ionic impurities are gradually accumulated, and there is concern that the accumulated ionic impurities affect the electronic parting section 120 and display in the actual display region E1. Therefore, it is preferable to sequentially move the ionic impurities, which have been attracted to the first electrode 131, to the second electrode 132 and further to the third electrode 133.

Since the AC signals with different phases are applied to the ion trap electrodes 130 while the liquid crystal device 100 is driven (during the display period) in the embodiment as described above, the traverse electric fields (line of electric force) caused between the adjacent ion trap electrodes 130 are scrolled in a direction from the first electrode 131 that is located at a close position to the electronic parting section 120 or the display region E toward the third electrode 133.

In doing so, it is possible to move the ionic impurities with the positive polarity or the negative polarity, which have been attracted to the first electrode 131, to the third electrode 133.

The method of driving the liquid crystal device 100, in which the ionic impurities are moved from the first electrode 131 to the third electrode 133 with elapse of time by scrolling the electric fields caused between the ion trap electrodes 130 as described above, will be referred to as "ion surf (IS) driving".

As illustrated in FIG. 9, the ionic impurities with the positive polarity moves in the display region E due to the flow of the liquid crystal molecules LC by the IS driving in a case in which the liquid crystal layer 50 includes the ionic impurities with the positive polarity (+), for example, in the display period during which the pixel electrodes 15 are driven. The rate of the flow is considered to depend on the frequency of the drive signal for driving the pixels P.

In addition, the ionic impurities are attracted to a parting region E3, in which the ion trap electrodes 130 are provided, and are carried to and accumulated at the third electrode 133 by the scrolling of the electric fields that move from the side of the first electrode 131 to the side of the third electrode 133 with elapse of time.

In contrast, the liquid crystal molecules LC on the dummy pixel electrodes 15d are in the substantially vertically oriented state in a non-display period during which the pixel electrodes 15 are not driven as illustrated in FIG. 10.

Therefore, the ionic impurities with the positive polarity, which have been attracted to the parting region E3, cannot easily be moved (re-defused) to the display region E.

In the case in which the liquid crystal layer 50 includes the ionic impurities with the negative polarity (−), the ionic impurities with the negative polarity are attracted from the first electrode 131 to the third electrode 133 with the scrolling of the electric fields between the ion trap electrodes 130 in the display period and cannot easily be moved (re-defused) to the display region E in the non-display period.

The counter substrate 20 according to the embodiment does not include the common electrode 23 provided at a portion facing the ion trap electrodes 130 via the liquid crystal layer 50. Therefore, the electric fields cannot easily be caused between the ion trap electrodes 130 and the common electrode 23.

For this reason, the ionic impurities are attracted to the parting region E3 without causing the movement of the ionic impurities to be prevented by the electric fields caused between the ion trap electrodes 130 and the common electrode 23.

Next, the width L1 of the first electrode 131 is the same as the width L2 of the second electrode 132, and the width L3 of the third electrode 133 is greater than the width L1 and the width L2 in the direction from the outer edge of the display region E toward the outside (sealing member 40) of the display region E according to the ion trap electrodes 130 in the embodiment as illustrated in FIG. 10. Specifically, the width L1 and the width L2 are 4 µm, for example, and the width L3 is 10 µm, for example.

The arrangement pitch of the first electrode 131, the second electrode 132, and the third electrode 133 is 12 µm, for example. That is, a distance S1 between the first electrode 131 and the second electrode 132 is 8 µm, and a distance S2 between the second electrode 132 and the third electrode 133 is the same as the distance S1, which is 8 µm.

A distance S3 between the dummy pixel electrodes 15d (electronic parting section 120) and the first electrode 131 in the X direction is greater than the distance S1 (=distance S2) and is 10 µm, for example.

In contrast, a distance between the dummy pixel electrodes 15d (electronic paring section 120) and the adjacent first electrode 131 in the Y direction is greater than the distance between the first electrode 131 and the second electrode 132 and is 10 m, for example.

With such a configuration, it is possible to reduce the influence of the electric fields caused between the first electrode 131 and the dummy pixel electrodes 15d (electronic parting section 120), which is related to the attraction of the ionic impurities.

In addition, it is preferable that the orientation film 18 for substantially vertically orienting the liquid crystal molecules LC with the negative dielectric anisotropy is formed so as to cover at least the pixel electrodes 15 and the dummy pixel electrodes 15d on the element substrate 10.

Since the ionic impurities are moved by scrolling the electric fields between the ion trap electrodes 130 in the embodiment, it is preferable that the ion trap electrodes 130 are formed so as not to be covered with the orientation film 18.

Effects of Ion Trap Mechanism

Figure 11:
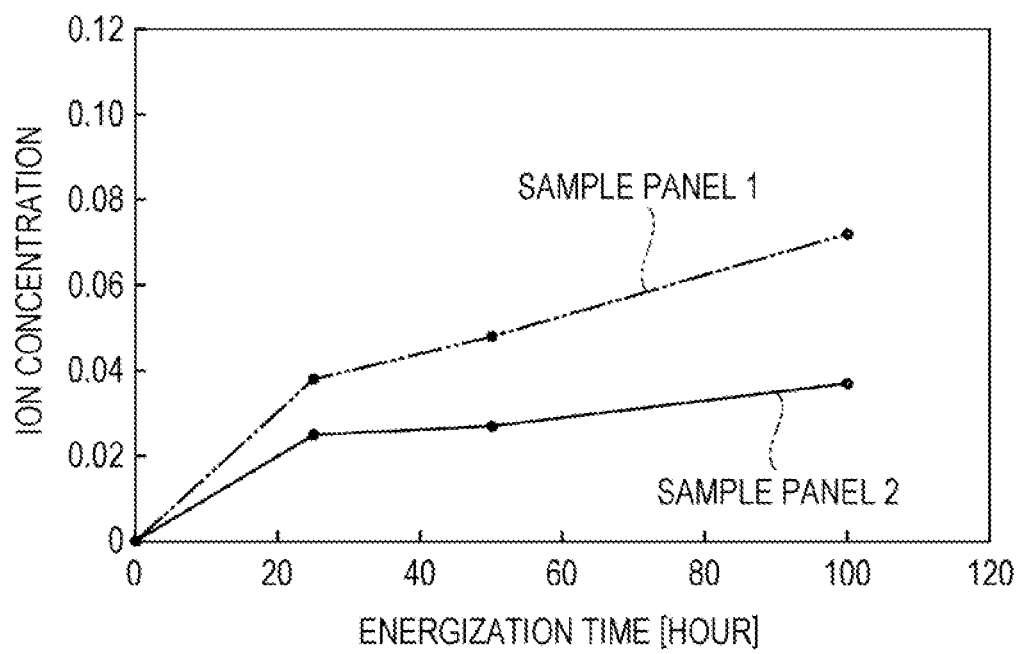
FIG. 11 is a graph illustrating a relationship between an energization time and a concentration of ionic impurities.

FIG. 11 is a graph illustrating a relationship between an energization time and a concentration of ionic impurities, where the horizontal axis represents the energization time (hour) and the vertical axis represents the concentration (non-dimensional) of the ionic impurities.

Figure 12:
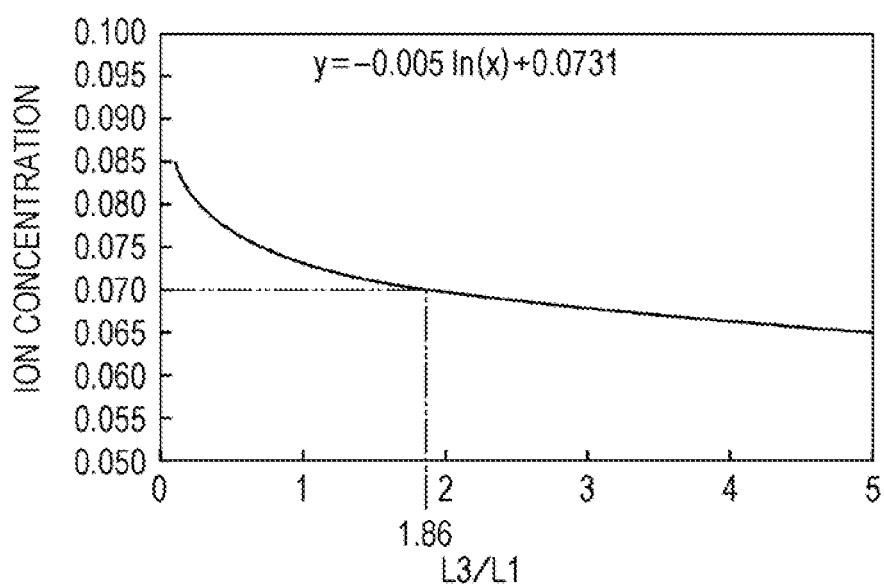
FIG. 12 is a graph illustrating a relationship between a width of the third electrode/a width of the first electrode and the concentration of the ionic impurities.

FIG. 12 is a graph illustrating a relationship between the width L3 of the third electrode 133/the width L1 of the first electrode 131 and the concentration of the ionic impurities, where the horizontal axis represents a ratio between the width L1 of the first electrode 131 and the width L3 of the third electrode 133 and the vertical axis represents the concentration (non-dimensional) of the ionic impurities.

The present inventors conducted an experiment for effects of the ion trap mechanism according to the embodiment as will be described below and obtained the results illustrated in FIGS. 11 and 12.

Two sample panels (Sample panel 1 and Sample panel 2), each of which includes ion trap electrodes 130 (the first electrode 131, the second electrode 132, and the third electrode 133) provided in a ring shape outside the display region E so as to surround the display region E were prepared.

Sample panel 1 was produced such that the width L1 of the first electrode 131, the width L2 of the second electrode 132, and the width L3 of the third electrode 133 were equal to each other.

Sample panel 2 was produced such that the width L3 of the third electrode 133 was 1000 times as wide as the width L1 of the first electrode 131 and the width L2 of the second electrode 132.

The common electrode 23 was patterned so as to provide a structure in which the common electrode 23 does not face the immediate upper portion of the ion trap electrodes 130 to the two sample panels for the purpose of providing the ion trap function in a wide range.

The frequency of the AC signals applied to the ion trap electrodes 130 was set to 1 Hz as a significantly lower frequency than the frequency in the display region E.

An aging test of energizing the two sample panels in a high-temperature environment with a temperature of 70° C., for example, after simultaneously leaving the two sample panels in a high-temperature high-humidity environment with a temperature of 85° C. and a humidity of 85%, for example, for 500 hours was conducted.

The two sample panels were extracted after elapse of 25 hours, 50 hours, and 100 hours from the start of the aging test, display in the respective display regions E was checked, and optical response waveforms were measured. Amplitude of the optical response waveforms was analyzed, and shift of the concentrations of the ionic impurities which were included in the liquid crystal in the liquid crystal layers 50 of the two sample panels was respectively calculated and represented by graphs for comparison.

Hereinafter, a description will be given of results obtained by the aging test.

As illustrated in FIG. 11, the concentration of the ionic impurities in Sample panel 1 was 0.038 after elapse of 25 hours from the start of the aging test while the concentration of the ionic impurities in Sample panel 2 was 0.025, which was about ⅔ of the concentration of Sample panel 1.

In addition, the concentration of the ionic impurities in Sample panel 1 was 0.048 after elapse of 50 hours from the start of the aging test while the concentration of the ionic impurities in Sample panel 2 was 0.027. The concentration of the ionic impurities in Sample panel 2 did not substantially change from the concentration (0.025) of the ionic impurities after elapse of 25 hours and was maintained at a small value.

Furthermore, the concentration of the ionic impurities in Sample panel 1 was 0.072 after elapse of 100 hours from the start of the aging test while the concentration of the ionic impurities in Sample panel 2 was 0.037. The value did not substantially change from the concentration (0.038) of the ionic impurities in Sample panel 1 after elapse of 25 hours and was maintained at a small value.

Based on the results of the experiment described hitherto, it was found that the concentration of the ionic impurities included in the liquid crystal in the liquid crystal layer 50 can be reliably reduced by the ion trap electrodes 130 by setting the width L3 to be 1000 times as wide as the width L1 and the width L2 in the ion trap electrodes 130.

Next, a relationship between a ratio of the width L3 of the third electrode 133 with respect to the width L1 of the first electrode 131 and the concentration of the ionic impurities included in the liquid crystal in the liquid crystal layer 50 in each of Sample panel 1 and Sample panel 2 after elapse of 100 hours from the start of the aging test was plotted as illustrated in FIG. 12, an approximate curve was depicted, and the following approximate equation (7) was calculated.

That is, $Y=-0.0051\ln(X)+0.0731$ (7)

It was confirmed that it was only necessary to set the concentration of the ionic impurities to be equal to or less than 0.07 in order to reduce defects of display quality of the liquid crystal device 100. Therefore, it is possible to know from the approximate equation (7) described above that the width L3 is to be 1.86 times or more as wide as the width L1 and the width L2 in order to set the concentration of the ionic impurities to be equal to or less than 0.07.

That is, it is possible to reduce the defects of display quality of the liquid crystal device 100 by setting the width L3 to be 1.86 times or more as wide as the width L1 and the width L2.

It is possible to estimate from the approximate curve illustrated in FIG. 12 that the concentration of the ionic impurities further decreases and the ion trap effect of the ion trap electrodes 130 is further enhanced if the width L3 becomes greater than the width that is 1.86 times as wide as the width L1 and the width L2.

According to the liquid crystal device 100 and the method of driving the liquid crystal device 100 of the first embodiment, the following effects can be achieved.

(1) The AC signals with different phases are applied to the first electrode 131, the second electrode 132, and the third electrode 133 in this order in a period of time corresponding to one cycle during which the first potential shifts from the reference potential to the positive polarity and to the negative polarity. Therefore, the electric fields (line of electric force) caused between the ion trap electrodes 130 are scrolled from the first electrode 131 located at a closer position to the display region E to the second electrode 132 and from the second electrode 132 to the third electrode 133 with elapse of time.

In doing so, the ionic impurities move with the scrolling of the electric field, are attracted to the first electrode 131 first, are then attracted to the second electrode 132, and are then attracted to the third electrode 133.

Furthermore, since the width L3 of the third electrode 133 is greater than the width L1 of the first electrode 131 and the width L2 of the second electrode 132 in the embodiment, it is possible to enhance force of accumulating the ionic impurities at the third electrode 133 as compared with a liquid crystal device with the ion trap electrodes configured such that the width L3 is equal to the width L1 and the width L2.

That is, it is possible to effectively attract the ionic impurities in the liquid crystal layer 50 from the display region E toward the outside, and as a result, it is possible to provide the liquid crystal device 100 with a reduced influence of the ionic impurities included in the liquid crystal layer 50 on display, such as image persistence.

(2) Since the ion trap electrodes 130 are provided so as to surround the display region E, it is possible to attract the ionic impurities from the display region E to the outside without affecting tendency of the ionic impurities being eccentrically located in the display region E.

(3) The display region E includes the electronic parting section 120 including the dummy pixel electrodes 15d that are provided so as to surround the plurality of pixel electrodes 15, and the distance S3 between the dummy pixel electrodes 15d (electronic parting section 120) and the first electrode 131 is greater than the distance S1 between the first electrode 131 and the second electrode 132.

Therefore, it is possible to reduce the influence of the scrolling of the electric fields caused between the first electrode 131 and the electronic parting section 120, which is related to the attraction of the ionic impurities.

(4) The ion trap electrodes 130 are provided on the element substrate 10 while the common electrode 23 is provided on the counter substrate 20. In addition, the outer edge of the common electrode 23 is located between the first electrode 131 and the outer edge of the display region E in a plan view.

Therefore, since the respective ion trap electrodes 130 do not face the common electrode 23 via the liquid crystal layer 50, the electric fields cannot easily be caused between the ion trap electrodes 130 and the common electrode 23.

That is, it is possible to effectively attract the ionic impurities to the outside of the display region E by scrolling the electric fields caused between the adjacent ion trap electrodes 130.

(5) Since each of the pixel electrodes 15 and the common electrode 23 is covered with the inorganic orientation film, it is possible to provide the liquid crystal device 100 with the suppressed influence of the ionic impurities on display even if the inorganic orientation film that easily adsorbs the ionic impurities is employed.

(6) Since the frequency f (Hz) of the AC signals satisfies $f \leq 2 \mu VE/np^2$, the frequency f (Hz) of the AC signals becomes the same as or smaller than the velocity (time) at which the ionic impurities move by a distance corresponding to the arrangement pitch of the electrodes. Therefore, it is possible to reliably attract the ionic impurities in the liquid crystal layer from the display region E to the outside.

(7) Since the AC signals with the same waveform are applied to the respective ion trap electrodes 130, it is not necessary to generate the AC signals with different waveforms for the respective electrodes. Therefore, it is possible to simplify the configuration of the drive circuit.

(8) Since the AC signals have potentials of three or more levels, potentials of three or more levels are applied to the respective ion trap electrodes 130. Therefore, it is possible to smoothly scroll the electric fields between the ion trap electrodes 130.

(9) Since the AC signals are rectangular waves, it is possible to generate the electric fields with stable intensity between the adjacent ion trap electrodes 130 and to further effectively attract the ionic impurities. In addition, it is possible to further easily generate the AC signals as compared with analog signals such as sine waves.

Second Embodiment
Configuration of Liquid Crystal Device

Figure 13:
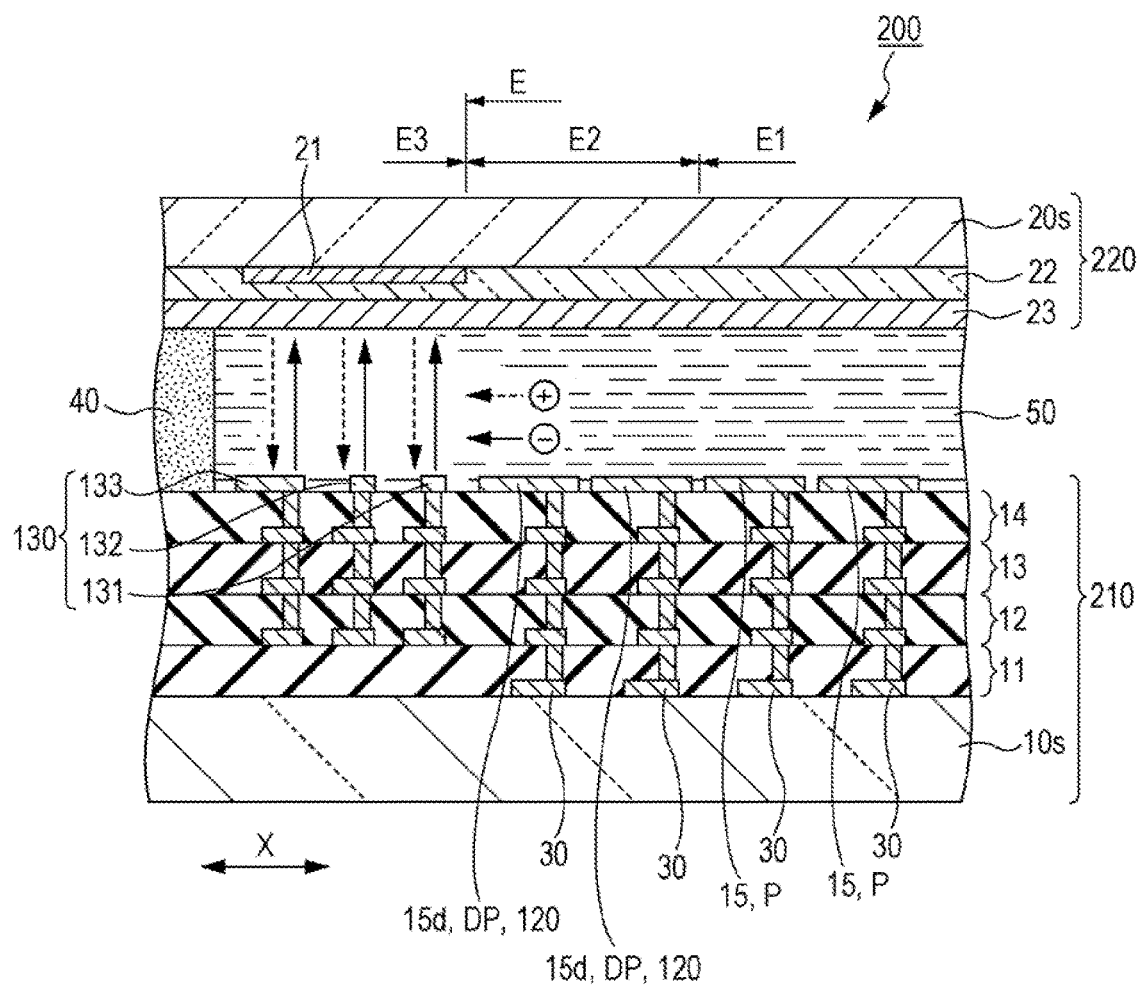
FIG. 13 is a sectional view schematically illustrating a structure of a liquid crystal device according to a second embodiment.

Next, a description will be given of a liquid crystal device 200 according to a second embodiment with reference to FIG. 13. FIG. 13 is a sectional view schematically illustrating a structure of the liquid crystal device 200 according to the embodiment. FIG. 13 is a schematic sectional view corresponding to FIG. 9 of the first embodiment. The same reference numerals will be given to the same configurations as those in the liquid crystal device 100 according to the first embodiment, and detailed descriptions thereof will be omitted.

In comparison with the liquid crystal device 100 according to the first embodiment, the liquid crystal device 200 according to the embodiment is different from the liquid crystal device 100 according to the first embodiment in that the common electrode 23 is provided on the counter substrate 220 from the display region E to the parting region E3 facing the ion trap electrodes 130 and the reference potential is provided to the common electrode 23 as illustrated in FIG. 13.

The liquid crystal device 200 includes a liquid crystal layer 50 that is interposed at a gap between an element substrate 210 and a counter substrate 220 that are attached to each other via a sealing member 40.

Pixel electrodes 15, dummy pixel electrodes 15d, and a first electrode 131, a second electrode 132, and a third electrode 133 as ion trap electrodes 130 are respectively arranged on a wiring layer 14 of the element substrate 210.

The width L3 of the third electrode 133 is formed to be greater than the width L1 of the first electrode 131 and the width L2 of the second electrode 132 in the ion trap electrodes 130 in the same manner as in the first embodiment, and the AC signals with the same frequency and mutually different phases in a period of time corresponding to one cycle, for example, the AC signals illustrated in FIG. 8 are applied to the respective ion trap electrodes 130.

If such AC signals are applied to the ion trap electrodes 130, the electric field represented by the arrow of the solid line or the broken line is generated between the first electrode 131 and the common electrode 23 in accordance with polarity of the first potential at the first electrode 131. Furthermore, the electric fields represented by the arrows of the solid lines or the broken lines are generated between the second electrode 132 and the common electrode 23 and between the third electrode 133 and the common electrode 23 in the same manner as in the case of the first electrode 131.

Since the AC signals with different phases are applied to the respective ion trap electrodes 130, these electric fields represented by the arrows of the solid lines or the broken lines are gradually scrolled in a direction from the first electrode 131 that is located at the closer position to the display region E toward the third electrode 133.

Based on the facts described hitherto, the liquid crystal device 200 according to the embodiment can attract the ionic impurities in the liquid crystal layer 50 in the display region E to the ion trap electrodes 130 by scrolling the electric fields generated between the ion trap electrodes 130 in the same manner as in the first embodiment though there is more influence of the intensity of the electric fields due to the thickness of the liquid crystal layer 50 as compared with the liquid crystal device 100 according to the first embodiment.

In addition, since it is not necessary to perform patterning so as to cause the common electrode 23 to correspond to the display region E and provide the routed wiring 23a in the same manner as in the liquid crystal device 100 according to the first embodiment, it is possible to simplify configurations of wiring and the like connected to the common electrode 23.

Third Embodiment

Configuration of Liquid Crystal Device

Figure 14:
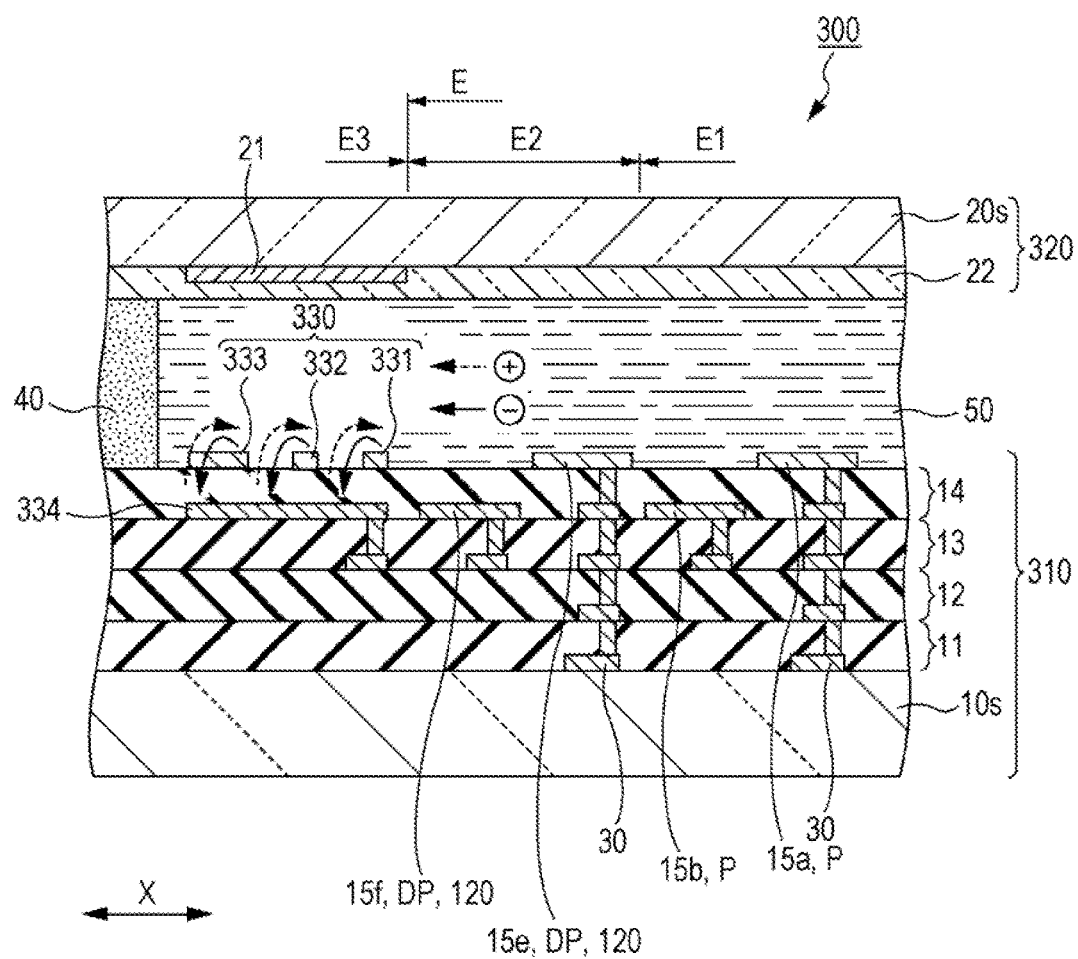
FIG. 14 is a sectional view schematically illustrating a configuration of a liquid crystal device according to a third embodiment.

Next, a description will be given of a liquid crystal device 300 according to a third embodiment with reference to FIG. 14. FIG. 14 is a sectional view schematically illustrating a structure of the liquid crystal device 300 according to the embodiment. FIG. 14 is a schematic sectional view corresponding to FIG. 9 of the first embodiment. The same reference numerals will be given to the same configurations as those in the liquid crystal device 100 according to the first embodiment, and the detailed descriptions thereof will be omitted.

As illustrated in FIG. 14, the liquid crystal device 300 according to the embodiment is different from the liquid crystal device 100 according to the first embodiment in that no electrode is provided on the surface of the counter substrate 320 on the side of the liquid crystal layer 50.

The liquid crystal device 300 includes a liquid crystal layer 50 that is interposed at a gap between the element substrate 310 and the counter substrate 320 that are attached to each other via a sealing member 40.

A first electrode 331, a second electrode 332, and a third electrode 333 as ion trap electrodes 330 are respectively arranged in a parting region E3 on a wiring layer 14 of the element substrate 310.

The width L3 of the third electrode 333 is formed to be greater than the width L1 of the first electrode 331 and the width L2 of the second electrode 332 in the ion trap electrode 330 in the same manner as in the aforementioned embodiments.

Furthermore, the liquid crystal device 300 includes a fourth electrode 334 provided on a lower layer than the ion trap electrodes 330 so as to face the ion trap electrodes 330. The fourth electrode 334 is supplied with the common potential.

The pixels P arranged in the actual display region E1 on the element substrate 310 are provided on the wiring layer 14 and include first pixel electrodes 15a that are connected to TFTs 30 and second pixel electrodes 15b that are provided in a lower layer than that of the first pixel electrodes 15a and are supplied with the common potential.

Dummy pixels DP arranged in the dummy pixel region E2 on the element substrate 310 include first dummy pixel electrodes 15e that are provided on the wiring layer 14 and are connected to the TFTs 30 and second dummy pixel electrodes 15f that are provided in a lower layer than that of the first dummy pixel electrodes 15e and are supplied with the common potential. The first dummy pixel electrode 15e and the second dummy pixel electrode 15f function as an electronic parting section 120.

Although illustration is omitted in FIG. 14, the first pixel electrodes 15a, the first dummy pixel electrodes 15e, the ion trap electrodes 330, and the surface of the counter substrate 320, which faces the liquid crystal layer 50, are covered with an organic orientation film. The liquid crystal molecules with the positive dielectric anisotropy are substantially horizontally oriented with respect to the organic orientation film.

The liquid crystal device 300 employs a so-called fringe field switching (FFS) scheme in which the light incident on the pixels P is modulated by scrolling the electric fields generated between the first pixel electrodes 15a and the second pixel electrodes 15b and changing the orientation direction of the liquid crystal molecules in the liquid crystal layer 50.

In the same manner as in the aforementioned embodiments, the AC signals with the same frequency and mutually different phase in a period of time corresponding one cycle, for example, the AC signals illustrated in FIG. 8 are applied to the respective ion trap electrodes 330.

If such AC signals are applied to the ion trap electrodes 330, the electric fields illustrated by the arrows of the solid lines or the broken lines are generated between the ion trap electrodes 330 and the fourth electrode 334 in accordance with the polarity of the first potential at the first electrode 331. Furthermore, the electric fields represented by the arrows of the solid lines or the broken lines are generated between the second electrode 332 and the fourth electrode 334 and between the third electrode 333 and the fourth electrode 334 in the same manner as in the case of the first electrode 331.

Since the AC signals with different phases are applied to the respective ion trap electrodes 330, these electric fields represented by the arrows of the solid line or the broken line are gradually scrolled in the direction from the first electrode 331 that is located at the closer position to the display region E toward the third electrode 333.

Based on the facts described hitherto, the liquid crystal device 300 according to the embodiment can attract the ionic impurities in the liquid crystal layer 50 in the display region E to the ion trap electrodes 330 by scrolling the electric fields generated between the ion trap electrodes 330.

Fourth Embodiment

Configuration of Liquid Crystal Device

Figure 15:
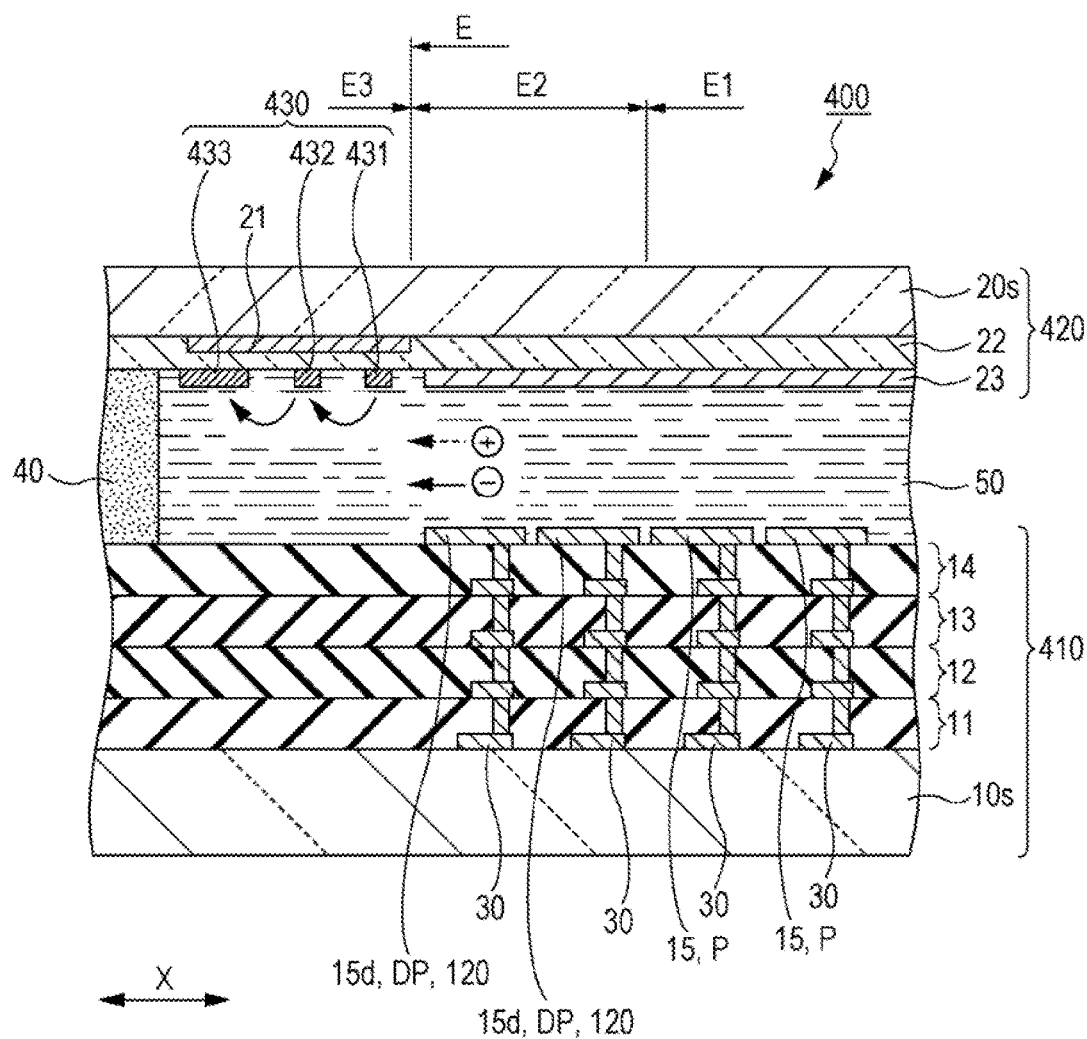
FIG. 15 is a sectional view schematically illustrating a configuration of a liquid crystal device according to a fourth embodiment.

Next, a description will be given of a liquid crystal device 400 according to a fourth embodiment with reference to FIG. 15. FIG. 15 is a sectional view schematically illustrating a structure of the liquid crystal device 400 according to the embodiment. FIG. 15 is a schematic sectional view corresponding to FIG. 9 of the first embodiment. The same reference numerals will be given to the same configurations as those in the liquid crystal device 100 according to the first embodiment, and the detailed descriptions thereof will be omitted.

As illustrated in FIG. 15, the liquid crystal device 400 according to the embodiment is different from the liquid crystal device 100 according to the first embodiment in that a first electrode 431, a second electrode 432, and a third electrode 433 as ion trap electrodes 430 are provided in a parting region E3 between a dummy pixel region E2 and a sealing member 40 on the side of a counter substrate 420 instead of the side of an element substrate 410 unlike the first embodiment.

In other words, the ion trap electrodes 430 are provided in the parting region E3 in the same layer as that of the common electrode 23 on the counter substrate 420.

The width L3 of the third electrode 433 is formed to be greater than the width L1 of the first electrode 431 and the width L2 of the second electrode 432 in the ion trap electrodes 430 in the same manner as in the aforementioned embodiments.

The liquid crystal device 400 includes a liquid crystal layer 50 interposed at a gap between the element substrate 410 and the counter substrate 420 that are attached to each other via a sealing member 40, and pixel electrodes 15 and dummy pixel electrodes 15d are arranged on a wiring layer 14 of the element substrate 410.

Although illustration is omitted in FIG. 15, the pixel electrodes 15 and the dummy pixel electrodes 15d are covered with an orientation film 18. The common electrode 23 and the ion trap electrodes 430 are covered with an orientation film 24.

Each of the common electrode 23 and the ion trap electrodes 430 are electrically connected to terminals for external connection, which are provided at terminal sections of the element substrate 410, via an upper limit conductive section provided between the element substrate 410 and the counter substrate 420.

AC signals with the same frequency and mutually different phases in a period of time corresponding to one cycle, for example, the AC signals illustrated in FIG. 8 are applied to the respective ion trap electrodes 430 in the same manner as in the aforementioned embodiments.

If such AC signals are applied to the respective ion trap electrodes 430, the electric fields represented by the arrows of the solid lines are generated between the respective electrodes in accordance with polarity.

Since the AC signals with different phases are applied to the respective ion trap electrodes 430, these electric fields represented by the arrows of the solid lines are gradually scrolled in a direction from the first electrode 431 that is located at a closer position to the display region E toward the third electrode 433.

Based on the facts described hitherto, the liquid crystal device 400 according to the embodiment can attract the ionic impurities in the liquid crystal layer 50 in the display region E to the ion trap electrodes 430 by scrolling the electric fields generated between the ion trap electrodes 430.

Fifth Embodiment

Electronic Apparatus

Next, a description will be given of a projection-type display apparatus 1000 as an electronic apparatus according to a fifth embodiment with reference to FIG. 16.

Figure 16:
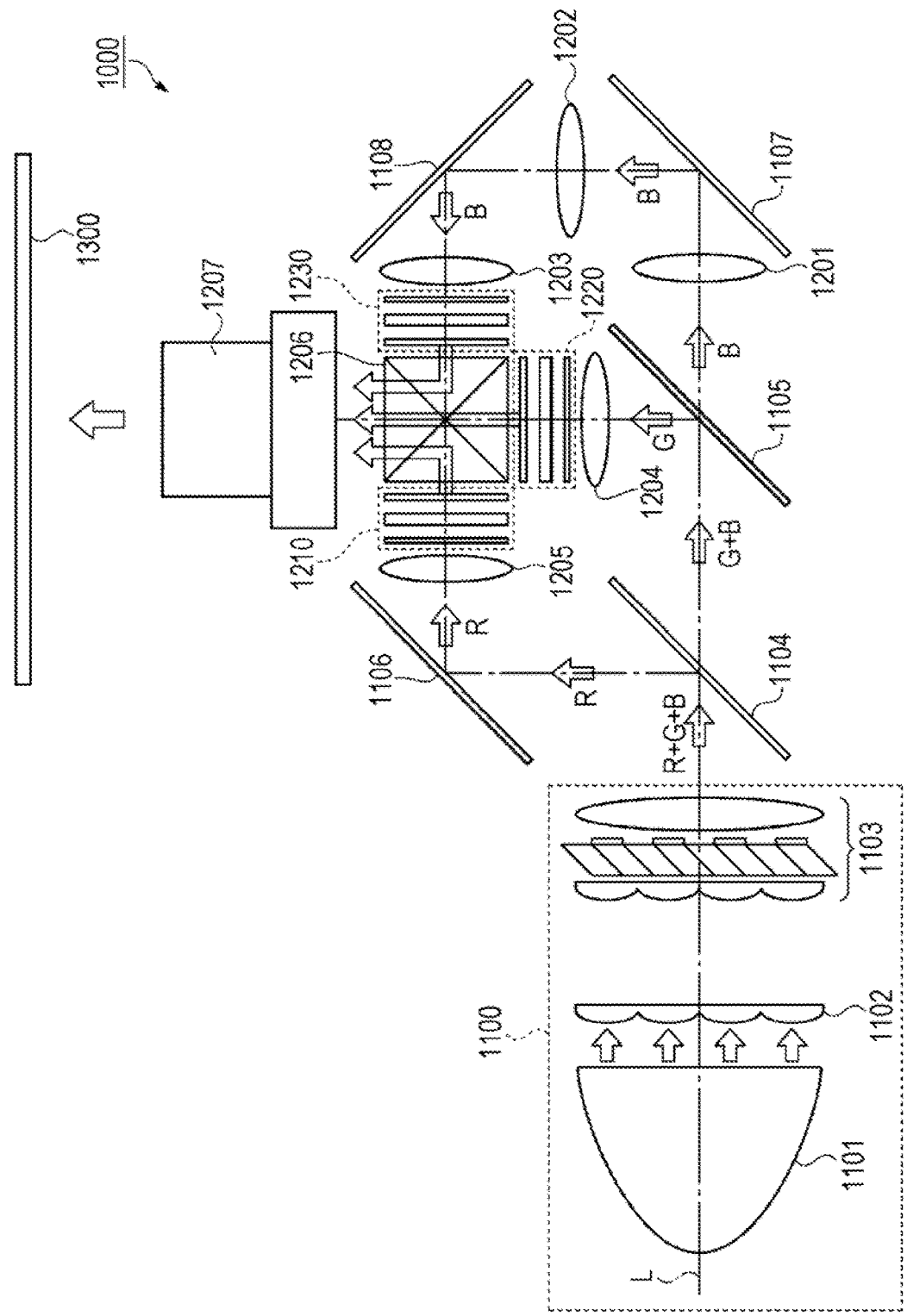
FIG. 16 is a plan view schematically illustrating a configuration of a projection-type display apparatus as an electronic apparatus according to a fifth embodiment.

FIG. 16 is a plan view schematically illustrating a configuration of the projection-type display apparatus 1000 as the electronic apparatus according to the embodiment.

As illustrated in FIG. 16, the projection-type display apparatus 1000 as the electronic apparatus according to the embodiment includes a polarized illumination device 1100 arranged along a system optical axis L, two dichroic mirrors 1104 and 1105 as optical isolation elements, three reflective mirrors 1106, 1107, and 1108, five relay lenses 1201, 1202, 1203, 1204, and 1205, three transmission-type liquid crystal light valves 1210, 1220, and 1230 as light modulation sections, a cross dichroic prism 1206 as an optical synthesis element, and a projection lens 1207.

The polarized illumination device 1100 is configured to include a lamp unit 1101 as a light source formed of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) therethrough from among polarized light fluxes outgoing from the polarized illumination device 1100. The other dichroic mirror 1105 reflects the green light (G) that has been transmitted through the dichroic mirror 1104 and transmits the blue light (B).

The red light (R) reflected by the dichroic mirror 1104 is reflected by the reflective mirror 1106 and is then incident on the liquid crystal light valve 1210 via the relay lens 1205.

The green light (G) reflected by the dichroic mirror 1105 is incident on the liquid crystal light valve 1220 via the relay lens 1204.

The blue light (B) that has been transmitted through the dichroic mirror 1105 is incident on the liquid crystal light valve 1230 via a light guiding system configured of the three relay lenses 1201, 1202, and 1203 and the two reflective mirrors 1107 and 1108.

The liquid crystal light valves 1210, 1220, and 1230 are respectively arranged so as to face the incident surfaces of the cross dichroic prism 1206 for light with each color. The light that is incident on the liquid crystal light valves 1210, 1220, and 1230 is modulated based on video information (video signal) and is made to outgo toward the cross dichroic prism 1206.

The prism is formed such that four right angle prisms are attached and a dielectric body multilayered film that reflects the red light and a dielectric body multilayered film that reflects the blue light are formed into a cross shape in the inner surface thereof. The light with the three colors is synthesized by these dielectric body multilayered films, and light representing a color image is synthesized.

The synthesized light is projected onto a screen 1300 by the projection lens 1207 as a projection optical system, and the image is displayed in an enlarged manner.

The liquid crystal light valve 1210 is realized by applying the liquid crystal device 100, 200, 300, or 400 (hereinafter, only the liquid crystal device 100 will be described as a representative example) including the aforementioned ion trap electrodes 130, 330, or 430 (hereinafter, only the ion trap electrode 130 will be described as a representative example). A pair of polarization elements arranged in crossed nicols is arranged with an integral on an incident side and an outgoing side of the color light of the liquid crystal panel 110. The other liquid crystal light valves 1220 and 1230 are also configured in the same manner.

Since such a projection-type display apparatus 1000 includes, as the liquid crystal light valves 1210, 1220, and 1230, the liquid crystal device 100 including the ion trap electrodes 130 as described above in the first to fourth embodiments, defects in display, such as image persistence, due to ionic impurities included in the liquid crystal layer are enhanced, and excellent display quality can be achieved.

The present invention is not limited to the aforementioned embodiments, and appropriate modifications can be made without departing from the gist and the spirit of the invention that can be read from the claims and the entire specification, and the thus modified liquid crystal devices, method of driving the liquid crystal devices, and electronic apparatuses to which the liquid crystal devices are applied are also within the technical scope of the invention. Various modification examples can be considered other than the aforementioned embodiments. Hereinafter, a description will be given of modification examples.

MODIFICATION EXAMPLE 1

In the aforementioned embodiments, arrangement of the ion trap electrodes 130 is not limited to the arrangement of surrounding the display region E. In a case in which a location where a defect of display occurs due to eccentrically located ionic impurities is specified as illustrated in FIG. 5, the ion trap electrodes 130 may be arranged in accordance with the location where such a defect of display occurs.

FIGS. 17A to 17E are plan views schematically illustrating arrangement of the ion trap mechanisms according to the modification example.

Figure 17A:
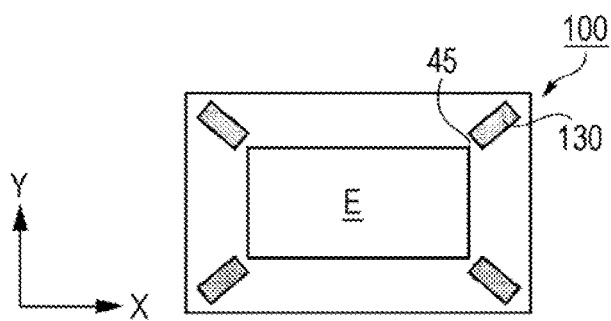
FIGS. 17A to 17E are plan views schematically illustrating arrangement of an ion trap mechanism according to modification examples.

As illustrated in FIG. 17A, for example, the ion trap electrodes 130 may be provided as the ion trap mechanism outside the display region E along at least one corner 45 of the display region E in the liquid crystal device 100 according to the aforementioned embodiment. FIG. 17A shows a case in which the ion trap electrodes 130 are provided at all the four corners 45.

With such a configuration, it is possible to reduce the space for arranging the ion trap electrodes 130. As a result, it is possible to secure a space for arranging another circuit, for example, outside the display region E.

MODIFICATION EXAMPLE 2

Figure 17B:
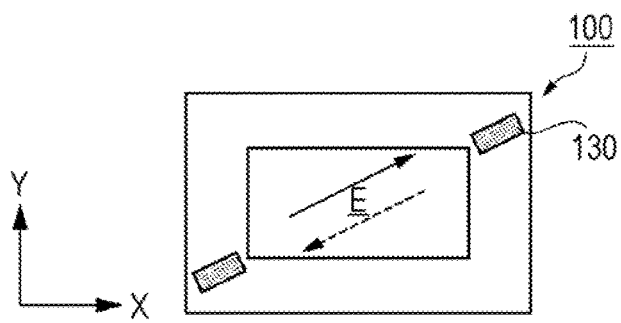

As illustrated in FIG. 17B, the ion trap electrodes 130 may be provided outside the display region E along a direction intersecting the orientation direction (liquid crystal orientation) of the liquid crystal layer in the liquid crystal device 100 according to the aforementioned embodiment.

Since the flow of the liquid crystal molecules LC occurs in a direction from the lower left side toward the upper right side as represented by the arrow of the broken line or the solid line in FIG. 17B, the ionic impurities move toward the lower left side or the upper right side of the display region E along the flow of the liquid crystal molecules LC.

With such a configuration, it is possible to effectively accumulate the ionic impurities which have been moved in the orientation direction (liquid crystal orientation) of the liquid crystal layer.

MODIFICATION EXAMPLE 3

Figure 17C:
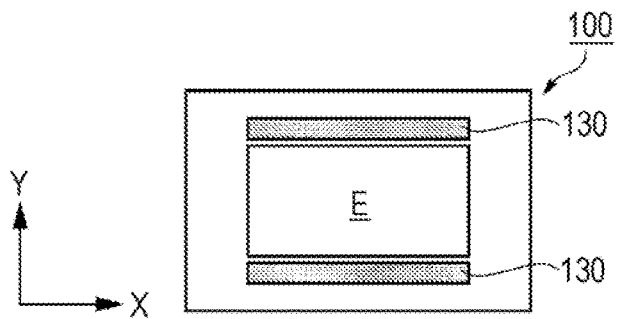

As illustrated in FIG. 17C, the ion trap electrodes 130 may be arranged in the X axis direction at the outer edges (longitudinal sides) of the display region E on the upper and lower sides in the liquid crystal device 100 according to the aforementioned embodiment. Alternatively, the ion trap electrodes 130 may be arranged one of the outer edges of the display region E on the upper and lower sides.

Figure 17D:
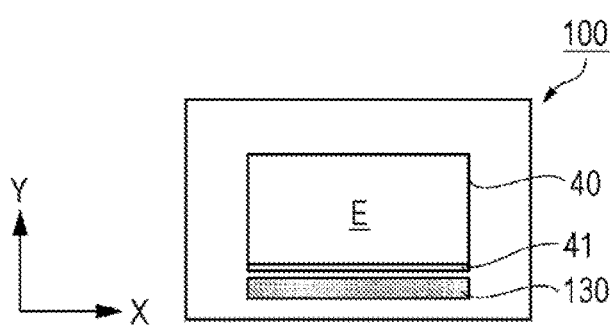

In a case in which the injection port 41 for injecting the liquid crystal into the sealing member 40 is provided at the outer edge of the display region E on the lower side as illustrated in FIG. 17D in particular, the ion trap electrodes 130 are preferably provided at least on the side of the injection port 41 at the outer edge of the display region E on the lower side.

With such a configuration, it is possible to effectively accumulate the ionic impurities generated from the injection port 41.

MODIFICATION EXAMPLE 4

Figure 17E:
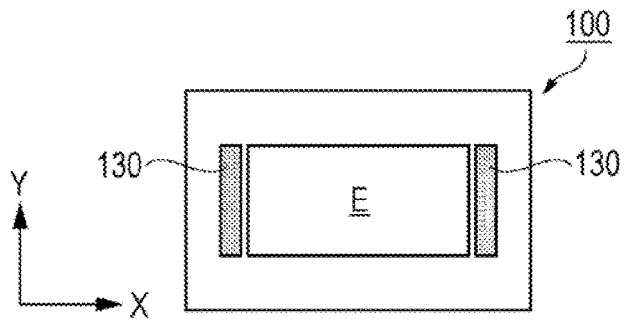

As illustrated in FIG. 17E, the ion trap electrodes 130 may be arranged in the Y axis direction at the outer edges of the display region E on the right and left sides (short sides) in the liquid crystal device 100 according to the aforementioned embodiment.

In a case in which a scanning direction of an image signal applied to the pixel electrodes 15 in the display region E is the X axis direction in particular, the ion trap electrodes 130 are preferably arranged in the Y axis direction (the direction intersecting the scanning direction of the image signal) at the outer edges of the display region E on the right and left sides (short sides).

With such a configuration, it is possible to effectively accumulate the ionic impurities that have been moved in the scanning direction of the image signal in the display region E. In addition, the ion trap electrode 130 may be arranged in one of the outer edges of the display region E on the right and left sides.

MODIFICATION EXAMPLE 5

The liquid crystal device 100 to which the ion trap electrodes 130 according to the aforementioned embodiment can be applied is not limited to a VA scheme or a FFS scheme, and it is also possible to apply the ion trap electrodes 130 to an in-plane switching (IPS) scheme, a fringe field switching (FFS) scheme, and an optically compensated birefringence (OCB) scheme.

In addition, the liquid crystal device 100 according to the aforementioned embodiment is not limited to the projection-type display apparatus 1000 of the transmission type as the electronic apparatus described in the fifth embodiment and can also be applied to a reflection-type display apparatus. In a case of applying the liquid crystal device 100 according to the aforementioned embodiment to the reflection-type display apparatus, the pixel electrodes 15 may be formed of Al or alloy containing Al, for example, with a light reflecting property.

Since the reflection-type liquid crystal device 100 is used in the liquid crystal light valve in such a reflection-type display apparatus, it is possible to project a bright image, to improve defects of display due to ionic impurities, and to provide a projection-type display apparatus of the reflection-type with excellent display quality.

MODIFICATION EXAMPLE 6

Furthermore, the electronic apparatus to which the liquid crystal device 100 according to the aforementioned embodiment is not limited to the projection-type display apparatus 1000 according to the fifth embodiment.

For example, the liquid crystal device 100 according to the aforementioned embodiment can be suitably used as a display section in an electronic apparatus such as a projection-type head-up display (HUD), a direct view-type head mount display (HMD), an electronic book, a personal computer, a digital still camera, a liquid crystal television, a view finder-type or monitor direct view-type video recorder, a car navigation system, an electronic personal organizer, or a POS.

The entire disclosure of Japanese Patent Application No. 2015-037881, filed Feb. 27, 2015 is expressly incorporated by reference herein.

What is claimed is:
1. A liquid crystal device comprising:
a first substrate and a second substrate that are arranged so as to face each other and are attached to each other via a sealing member;
a liquid crystal layer that is interposed between the first substrate and the second substrate;
pixel electrodes that are provided in a display region on the first substrate;
a counter electrode that is provided on the first substrate or the second substrate so as to face the pixel electrodes;
a first electrode that is provided between the display region and the sealing member in a plan view and is supplied with a first potential;
a second electrode that is provided between the first electrode and the sealing member in a plan view and is supplied with a second potential; and
a third electrode that is provided between the second electrode and the sealing member in a plan view and is supplied with a third potential, the first electrode, the second electrode, and the third electrode being provided on the first substrate or the second substrate,
wherein AC signals with the same frequency are applied to each of the first electrode, the second electrode, and the third electrode such that
the first potential shifts from positive polarity or a reference potential to negative polarity and shifts from the negative polarity to the positive polarity or the reference potential during a period of time corresponding to one and a half cycles of a first potential signal;

the second potential shifts from the positive polarity or the reference potential to the negative polarity after the first potential shifts from the positive polarity or the reference potential to the negative polarity and before the first potential then shifts to the reference potential or the positive polarity during the period of time corresponding to one and a half cycles of the first potential signal;

the third potential shifts from the positive polarity or the reference potential to the negative polarity after the second potential shifts to the negative polarity and before the second potential then shifts to the reference potential or the positive polarity during the period of time corresponding to one and a half cycles of the first potential signal;

the second potential shifts from the negative polarity or the reference potential to the positive polarity after the first potential shifts from the negative polarity or the reference potential to the positive polarity and before the first potential then shifts to the reference potential or the negative polarity during the period of time corresponding to one and a half cycles of the first potential signal; and the third potential shifts from the negative polarity or the reference potential to the positive polarity after the second potential shifts from the negative polarity or the reference potential to the positive polarity and before the second potential then shifts to the reference potential or the negative polarity during the period of time corresponding to one and a half cycles of the first potential signal; and wherein a width of the third electrode is wider than widths of the first electrode and the second electrode in a direction from an outer edge of the display region toward the sealing member.

2. The liquid crystal device according to claim 1, wherein the width of the third electrode is equal to or greater than 1.86 times as wide as the width of the first electrode.

3. An electronic apparatus comprising:
the liquid crystal device according to claim 2.

4. The liquid crystal device according to claim 1, wherein the first electrode, the second electrode, and the third electrode are provided on the first substrate so as to surround the display region.

5. The liquid crystal device according to claim 4, wherein the display region includes an electronic parting section with dummy pixel electrodes provided so as to surround the plurality of pixel electrodes, and
wherein a gap between the electronic parting section and the first electrode is greater than a gap between the first electrode and the second electrode.

6. An electronic apparatus comprising:
the liquid crystal device according to claim 4.

7. The liquid crystal device according to claim 1, wherein the display region includes corners, and
wherein the first electrode, the second electrode, and the third electrode are arranged along at least one of the corners.

8. The liquid crystal device according to claim 1, wherein the sealing member includes an injection port for injecting liquid crystal into the liquid crystal layer, and
wherein the first electrode, the second electrode, and the third electrode are provided on the side of the injection port.

9. The liquid crystal device according to claim 1, wherein the first electrode, the second electrode, and the third electrode are provided along a direction that intersects an orientation direction (liquid crystal orientation) of the liquid crystal layer.

10. The liquid crystal device according to claim 1, wherein the first electrode, the second electrode, and the third electrode are provided along a direction that intersects a scanning direction of an image signal applied to the pixel electrodes in the display region.

11. The liquid crystal device according to claim 1, wherein the first electrode, the second electrode, the third electrode are provided on the first substrate,
wherein the counter electrode is provided on the second substrate, and
wherein an outer edge of the counter electrode is located between the first electrode and the outer edge of the display region in a plan view.

12. The liquid crystal device according to claim 1, wherein the first electrode, the second electrode, and the third electrode are provided on the first substrate, and
wherein the counter electrode includes the display region in a plan view on the second substrate, is provided so as to extend to a region at which the counter electrode faces the first electrode, the second electrode, and the third electrode, and is supplied with the reference potential.

13. The liquid crystal device according to claim 1, wherein each of the pixel electrodes and the counter electrode is covered with an inorganic orientation film.

14. An electronic apparatus comprising:
the liquid crystal device according to claim 1.

15. A method of driving a liquid crystal device including a first substrate and a second substrate that are arranged so as to face each other and are attached to each other via a sealing member,
a liquid crystal layer that is interposed between the first substrate and the second substrate,
pixel electrodes that are provided in a display region on the first substrate,
a counter electrode that is provided on the first substrate or the second substrate so as to face the pixel electrodes,
a first electrode that is provided between the display region and the sealing member in a plan view and is supplied with a first potential,
a second electrode that is provided between the first electrode and the sealing member in a plan view and is supplied with a second potential, and
a third electrode that is provided between the second electrode and the sealing member in a plan view and is supplied with a third potential, the first electrode, the second electrode, and the third electrode being provided on the first substrate or the second substrate,
the method comprising:
applying AC signals with the same frequency to each of the first electrode, the second electrode, and the third electrode such that
the second potential shifts from positive polarity or a reference potential to negative polarity after the first potential shifts from the positive polarity or the reference potential to the negative polarity and before the first potential then shifts to the reference potential or the positive polarity, the third potential shifts from the positive polarity or the reference potential to the negative polarity after the second potential shifts to the negative polarity and before the second potential then shifts to the reference potential or the positive polarity, the second potential shifts from the negative polarity or the reference potential to the positive polarity after the first potential shifts from the negative polarity or the reference potential to the positive polarity and before the first potential then shifts to the reference potential or the negative polarity, and the third potential shifts from the negative polarity or the reference potential to the positive polarity after the second potential shifts from the negative polarity or the reference potential to the positive polarity and the second potential then shifts to the reference potential or the negative polarity, wherein a width of the third electrode is wider than widths of the first electrode and the second electrode in a direction from an outer edge of the display region toward the sealing member.

16. The method of driving a liquid crystal device according to claim 15, wherein the frequency f (Hz) of the AC signals satisfies the following equation:

$f \leq 2\mu VE/np^2$ where µ represents mobility (m²/V·s (second)) of ionic impurities in the liquid crystal layer, VE represents an effective voltage (V) of the AC signals, n represents the number of electrodes to which the AC signals are supplied, and p represents an arrangement pitch (m) of the electrodes to which the AC signals are supplied.

17. The method of driving a liquid crystal device according to claim 15, wherein the AC signals with the same waveform are applied to each of the first electrode, the second electrode, and the third electrode.

18. The method of driving a liquid crystal device according to claim 17, wherein the AC signals have potentials of three or more levels.

19. The method of driving a liquid crystal device according to claim 17, wherein the AC signals have a rectangular waveform.

20. An electronic apparatus comprising:

a liquid crystal device that is driven by the method of driving a liquid crystal device according to claim 15.

* * * * *